(12) United States Patent
Miyazaki et al.

(10) Patent No.: US 9,769,779 B2
(45) Date of Patent: Sep. 19, 2017

(54) RADIO BASE STATION, RADIO COMMUNICATION NETWORK SYSTEM, AND COMMUNICATION CONTROL METHOD

(75) Inventors: Masayuki Miyazaki, Tokyo (JP); Yasutaka Serizawa, Tokyo (JP); Makoto Katagishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 14/399,064

(22) PCT Filed: May 14, 2012

(86) PCT No.: PCT/JP2012/062264

§ 371 (c)(1),
(2), (4) Date: Nov. 5, 2014

(87) PCT Pub. No.: WO2013/171817

PCT Pub. Date: Nov. 21, 2013

(65) Prior Publication Data

US 2015/0109991 A1 Apr. 23, 2015

(51) Int. Cl.
*H04W 56/00* (2009.01)
*H04W 4/00* (2009.01)
(Continued)

(52) U.S. Cl.
CPC ........... *H04W 56/002* (2013.01); *H04W 4/00* (2013.01); *H04W 52/46* (2013.01); (Continued)

(58) Field of Classification Search
CPC ..... H04W 4/00; H04W 52/46; H04W 56/002; H04W 56/0015; H04W 4/22; H04W 52/383; H04W 52/146; H04W 52/267; H04W 52/283; H04W 88/04
USPC .................................................. 370/315, 350
See application file for complete search history.

(56) References Cited

U.S. PATENT DOCUMENTS

2004/0072568 A1 4/2004 Kim
2004/0095891 A1 5/2004 Nakagawa
(Continued)

FOREIGN PATENT DOCUMENTS

JP 2001-128231 A 5/2001
JP 2003-518822 A 6/2003
(Continued)

OTHER PUBLICATIONS

International Search Report (PCT/ISA/210) dated Jun. 12, 2012 with English translation (five pages).

*Primary Examiner* — Kan Yuen
*Assistant Examiner* — Richard Chang
(74) *Attorney, Agent, or Firm* — Crowell & Moring LLP

(57) ABSTRACT

A short-distance radio communication in a steady situation and a long-distance radio communication in an unsteady situation are dynamically switched in a radio communication network, and a steady communication and an unsteady communication are realized through the same radio communication network without affecting the respective communication qualities. A radio communication network system includes radio terminals that enable a multihop communication, and a radio base station. The radio base station and the radio terminals communicate with each other by at least two kinds of transmission radio wave powers. The transmission radio wave power is variably controlled according to a measurement data value by sensors of the radio terminals, or a content of data received by a data communication. Also, respective transmission times of the radio terminals, the radio relay station, and the radio base station are determined, and the transmission times do not change even if the transmission radio wave power changes (refer to FIG. 1).

9 Claims, 19 Drawing Sheets

(51) Int. Cl.

| | |
|---|---|
| ***H04W 52/46*** | (2009.01) |
| *H04W 4/22* | (2009.01) |
| *H04W 88/04* | (2009.01) |
| *H04W 52/14* | (2009.01) |
| *H04W 52/26* | (2009.01) |
| *H04W 52/28* | (2009.01) |
| *H04W 52/38* | (2009.01) |

(52) U.S. Cl.
CPC .......... *H04W 56/0015* (2013.01); *H04W 4/22* (2013.01); *H04W 52/146* (2013.01); *H04W 52/267* (2013.01); *H04W 52/283* (2013.01); *H04W 52/383* (2013.01); *H04W 88/04* (2013.01)

(56) References Cited

U.S. PATENT DOCUMENTS

| | | | | |
|---|---|---|---|---|
| 2006/0199530 | A1 | 9/2006 | Kawasaki | |
| 2007/0218868 | A1 | 9/2007 | Schefczik | |
| 2009/0323654 | A1 * | 12/2009 | Nagata .................. | H04W 16/06 370/338 |
| 2010/0035542 | A1 | 2/2010 | Fujishima et al. | |
| 2011/0212744 | A1 * | 9/2011 | Katayama ........... | H04W 52/143 455/522 |
| 2013/0095845 | A1 * | 4/2013 | Lim .................. | H04W 36/0066 455/452.2 |
| 2014/0335883 | A1 * | 11/2014 | Ericson ............. | H04W 72/0486 455/452.2 |

FOREIGN PATENT DOCUMENTS

| | | | |
|---|---|---|---|
| JP | 2004-140773 | A | 5/2004 |
| JP | 2006-33601 | A | 2/2006 |
| JP | 2006-246202 | A | 9/2006 |
| JP | 2008-244756 | A | 10/2008 |
| JP | 2009-530972 | A | 8/2009 |
| JP | 2010-41685 | A | 2/2010 |

* cited by examiner

[FIG. 1]
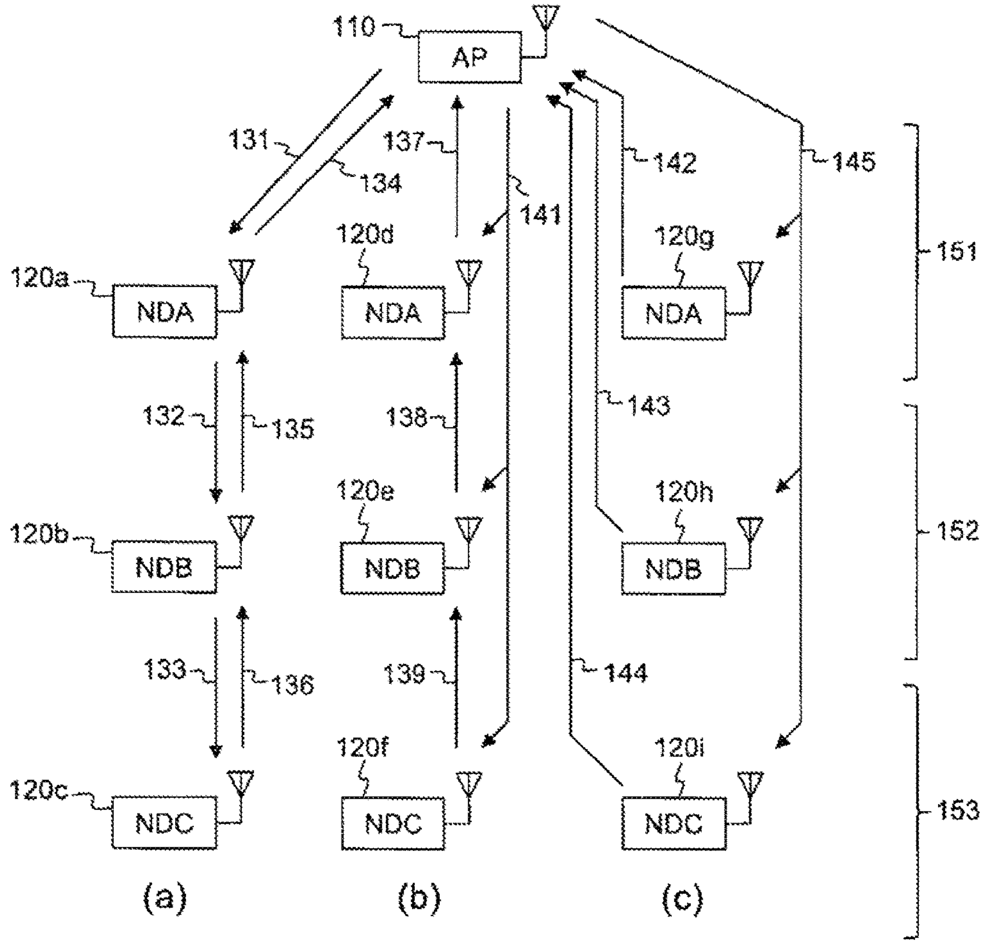

[FIG. 2]
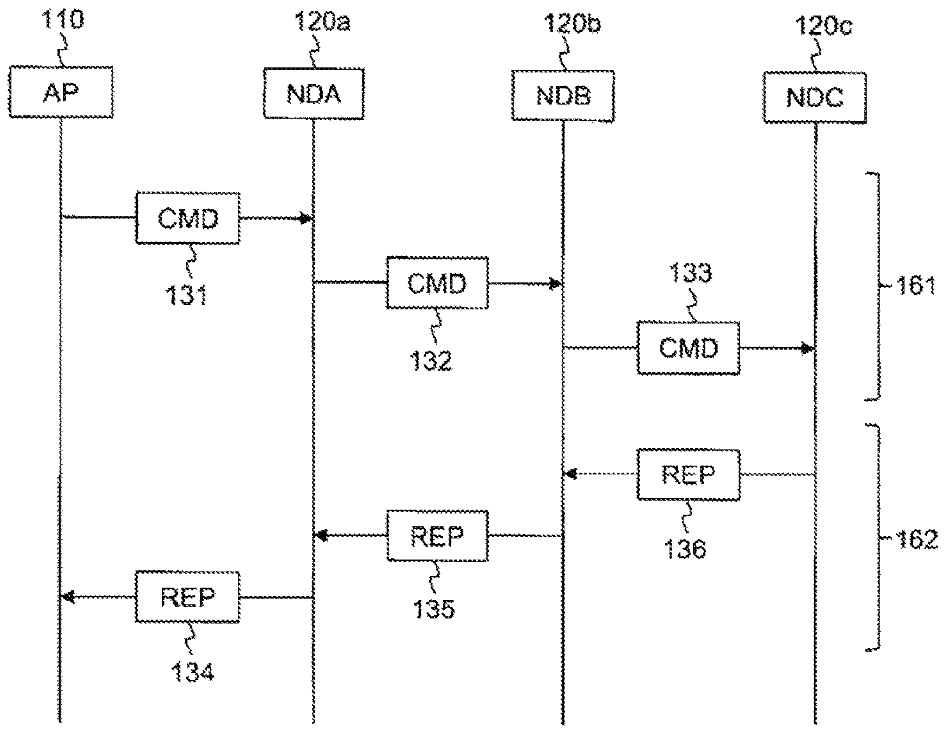

[FIG. 3]
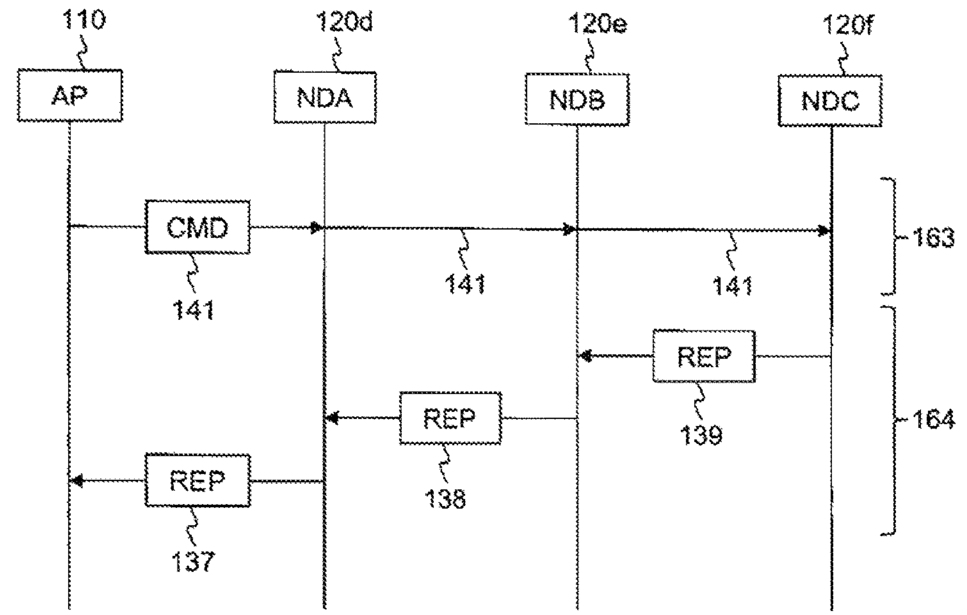
[FIG. 4]
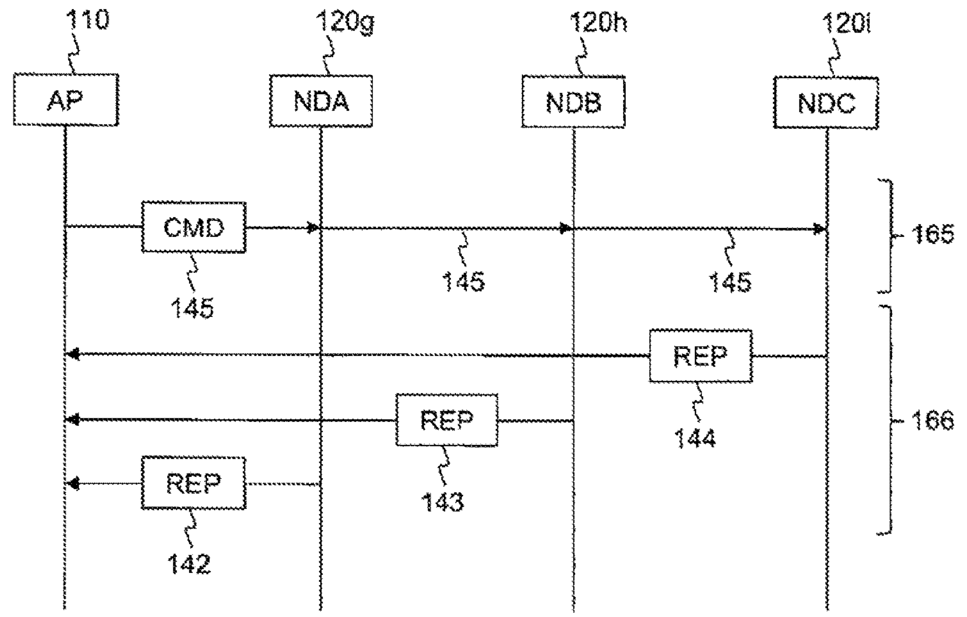

[FIG. 5]
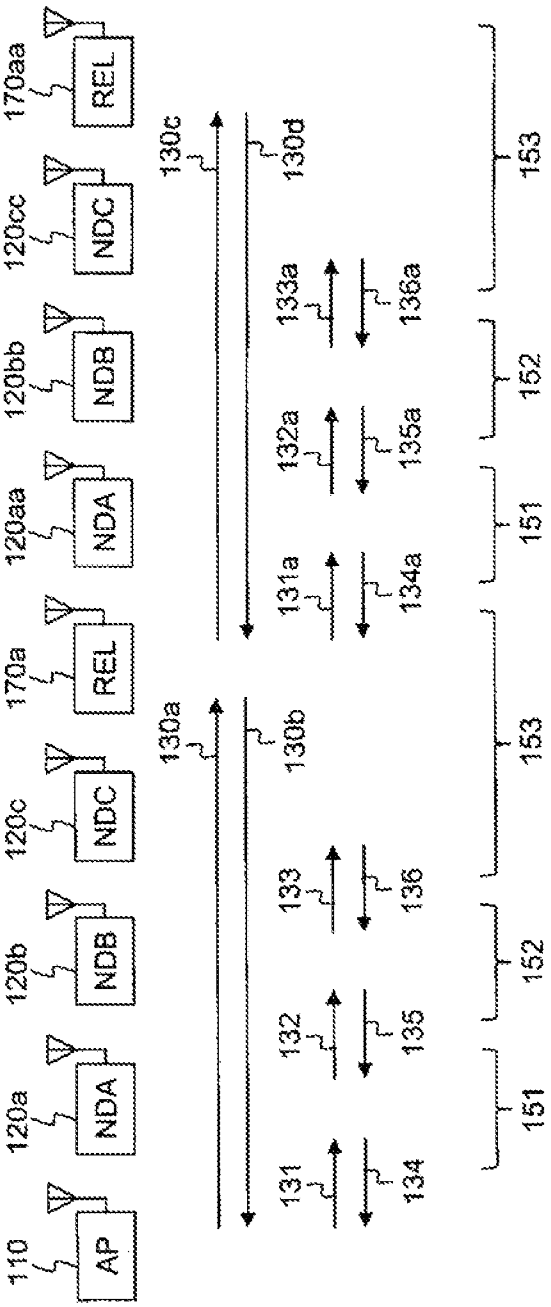

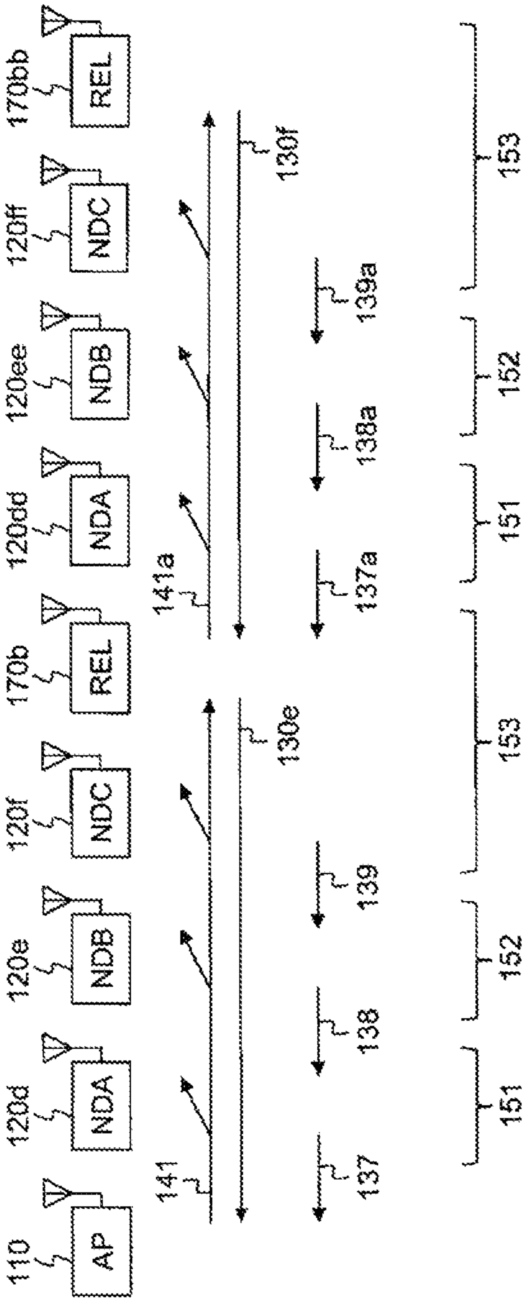
[FIG. 6]

[FIG. 7]
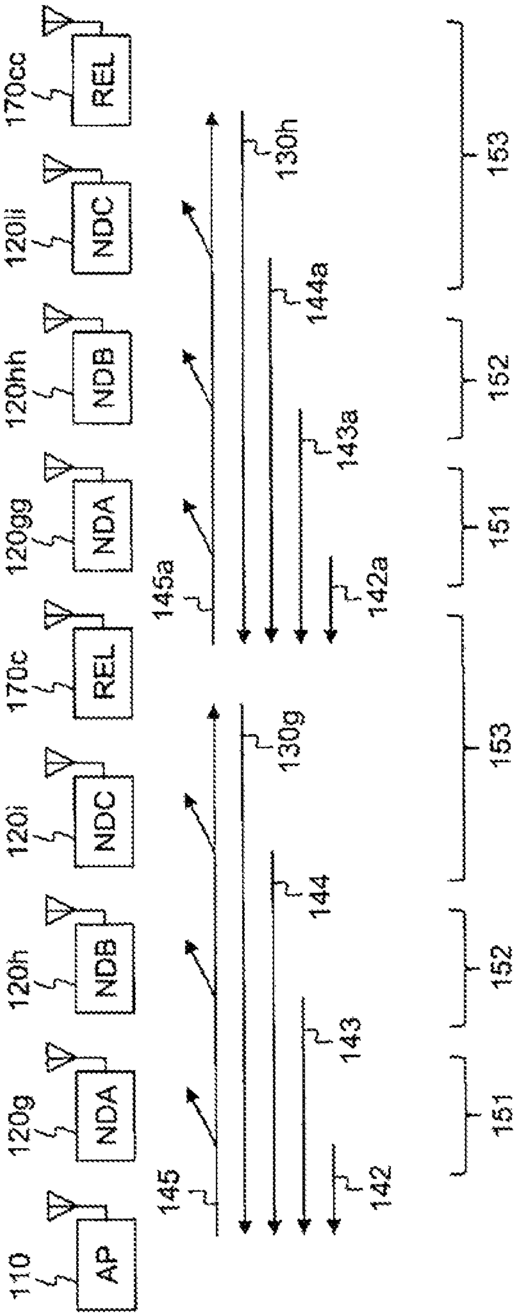

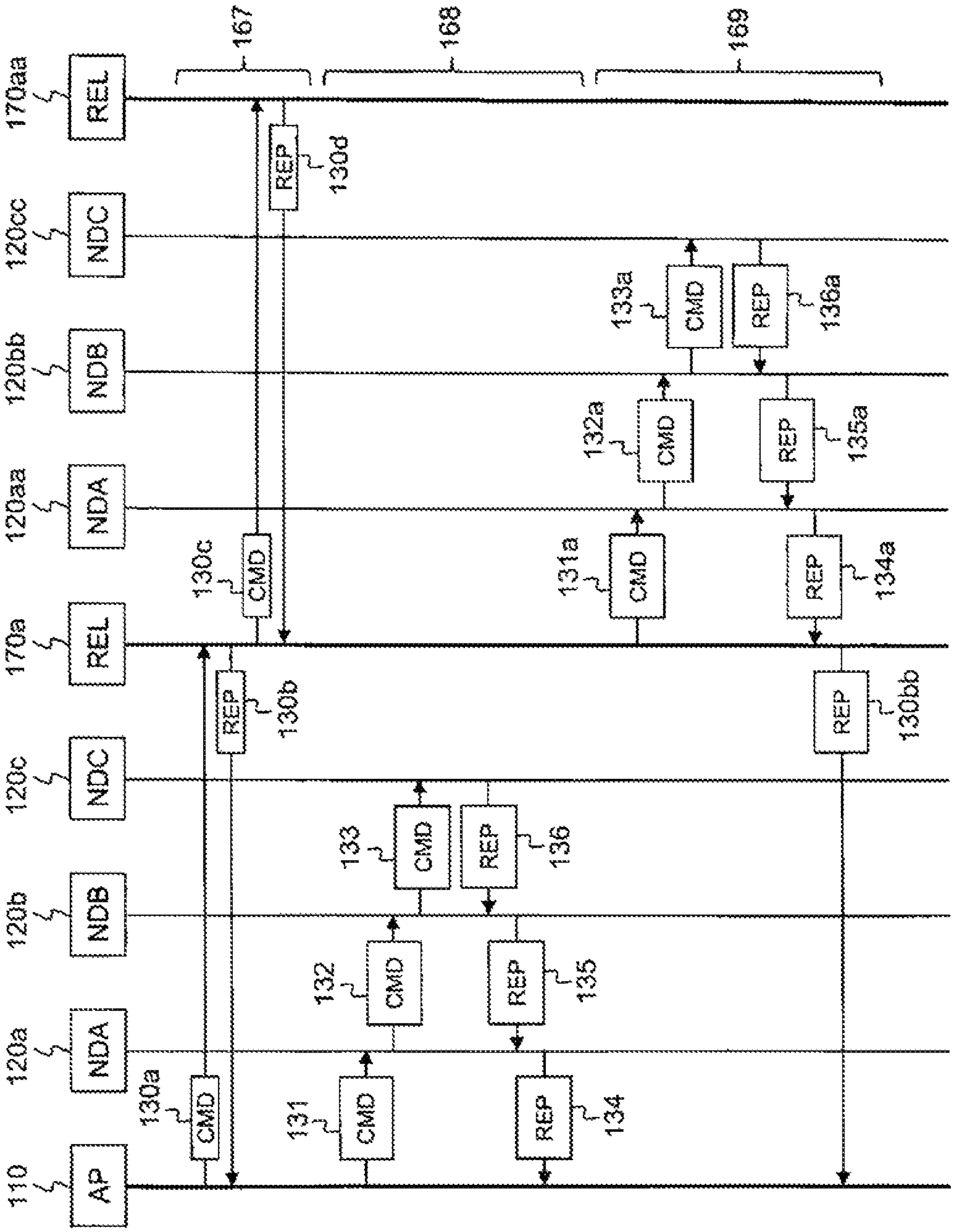
[FIG. 8]

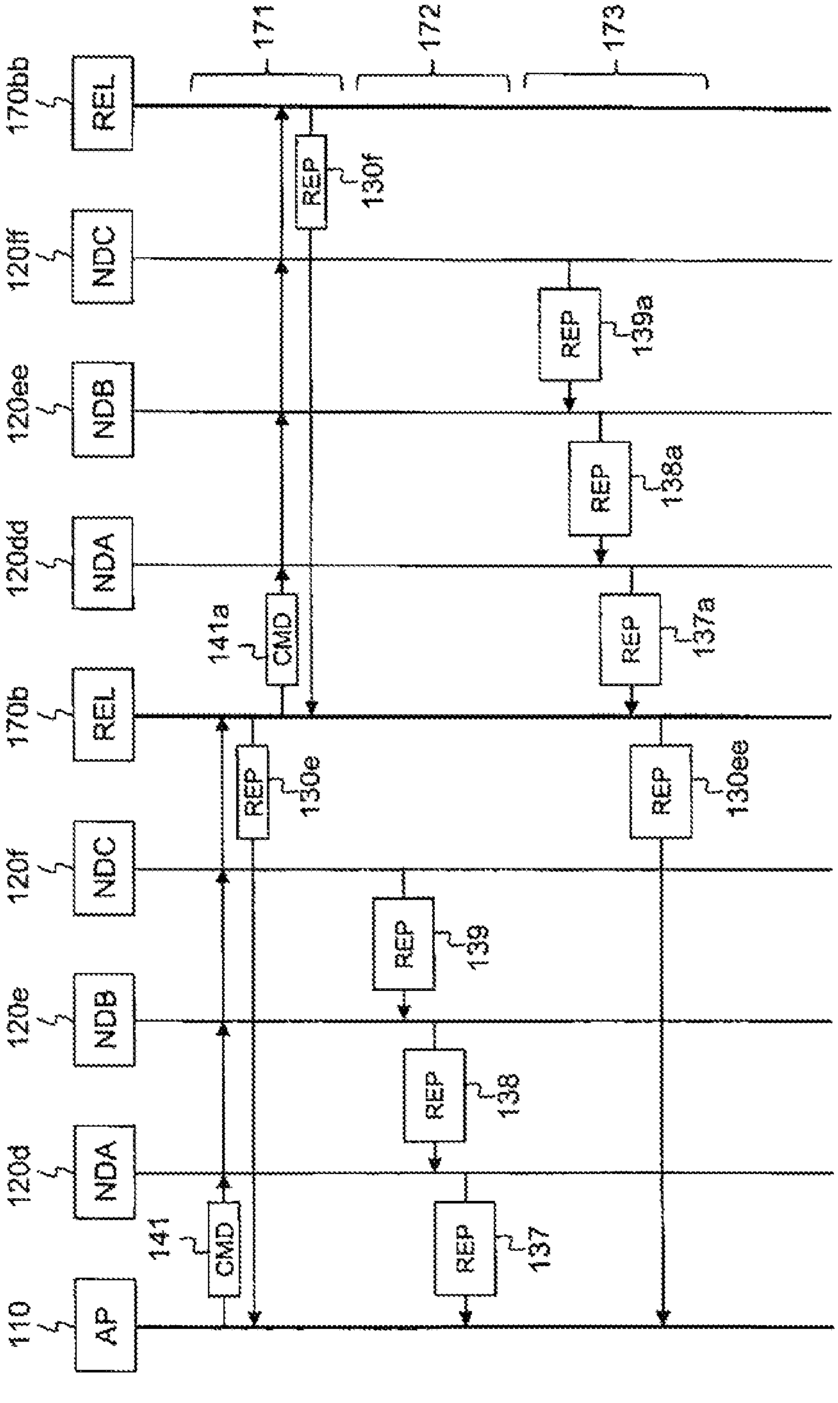
[FIG. 9]

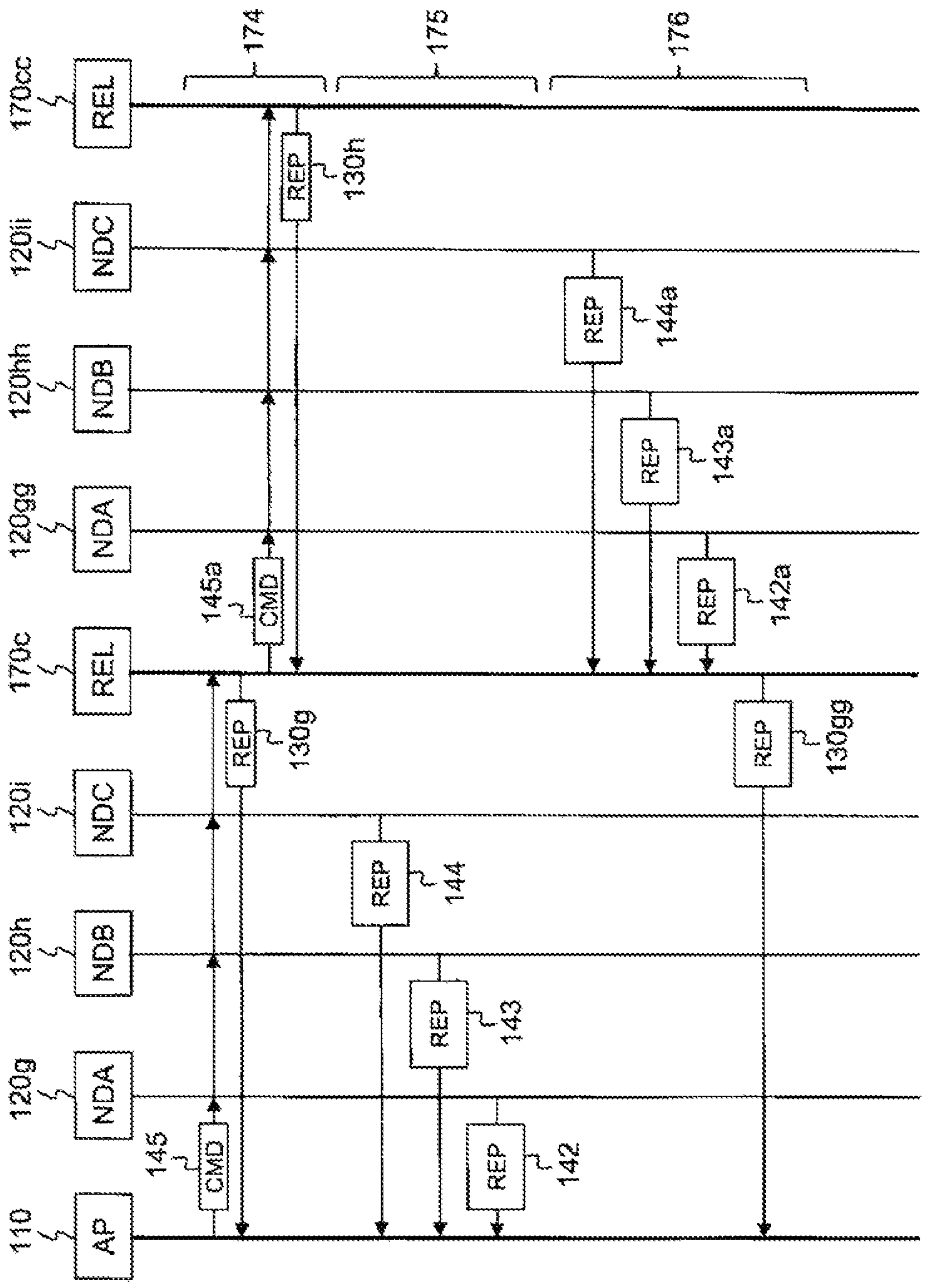
[FIG. 10]

[FIG. 11]
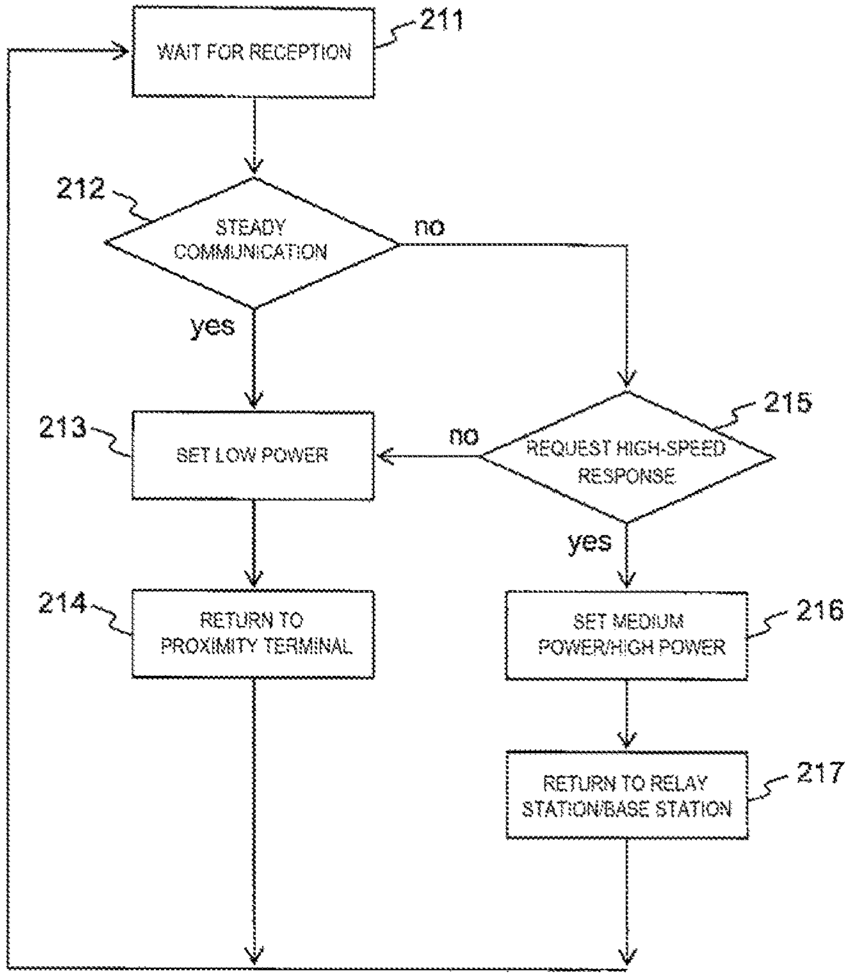

[FIG. 12]
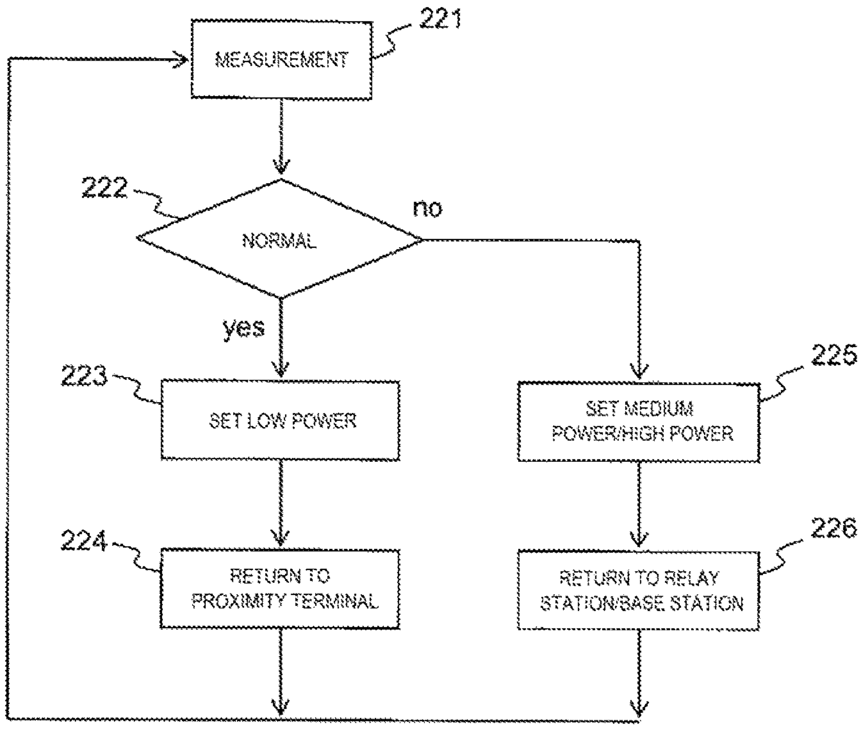

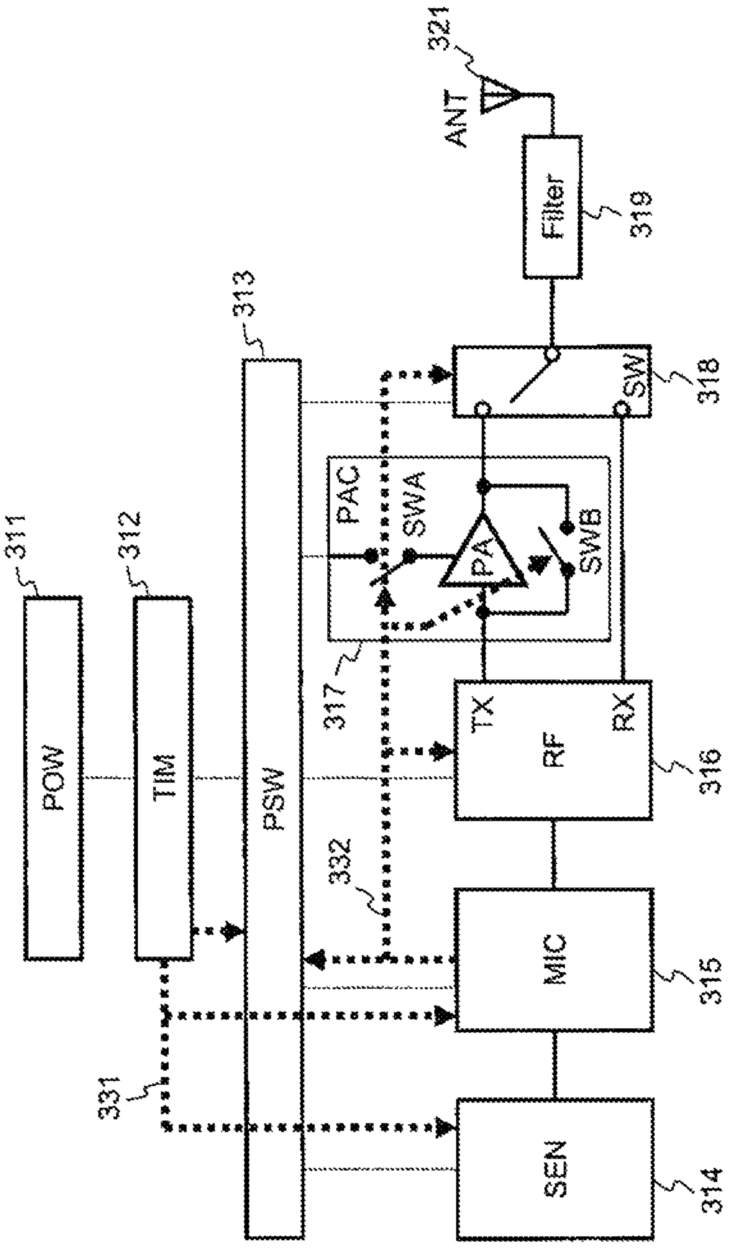
[FIG. 13]

[FIG. 14]
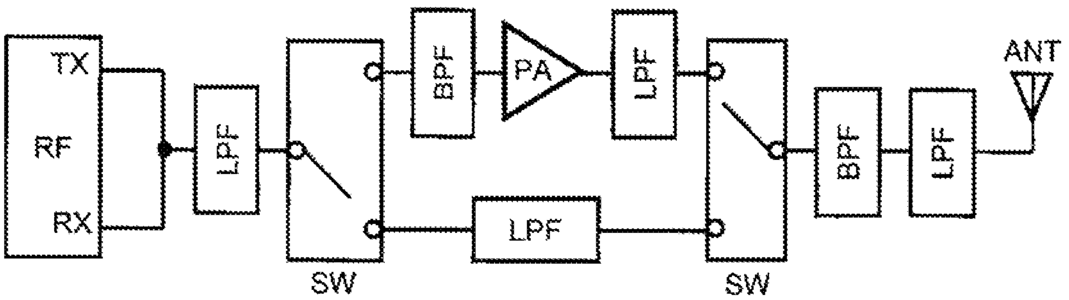

[FIG. 15]
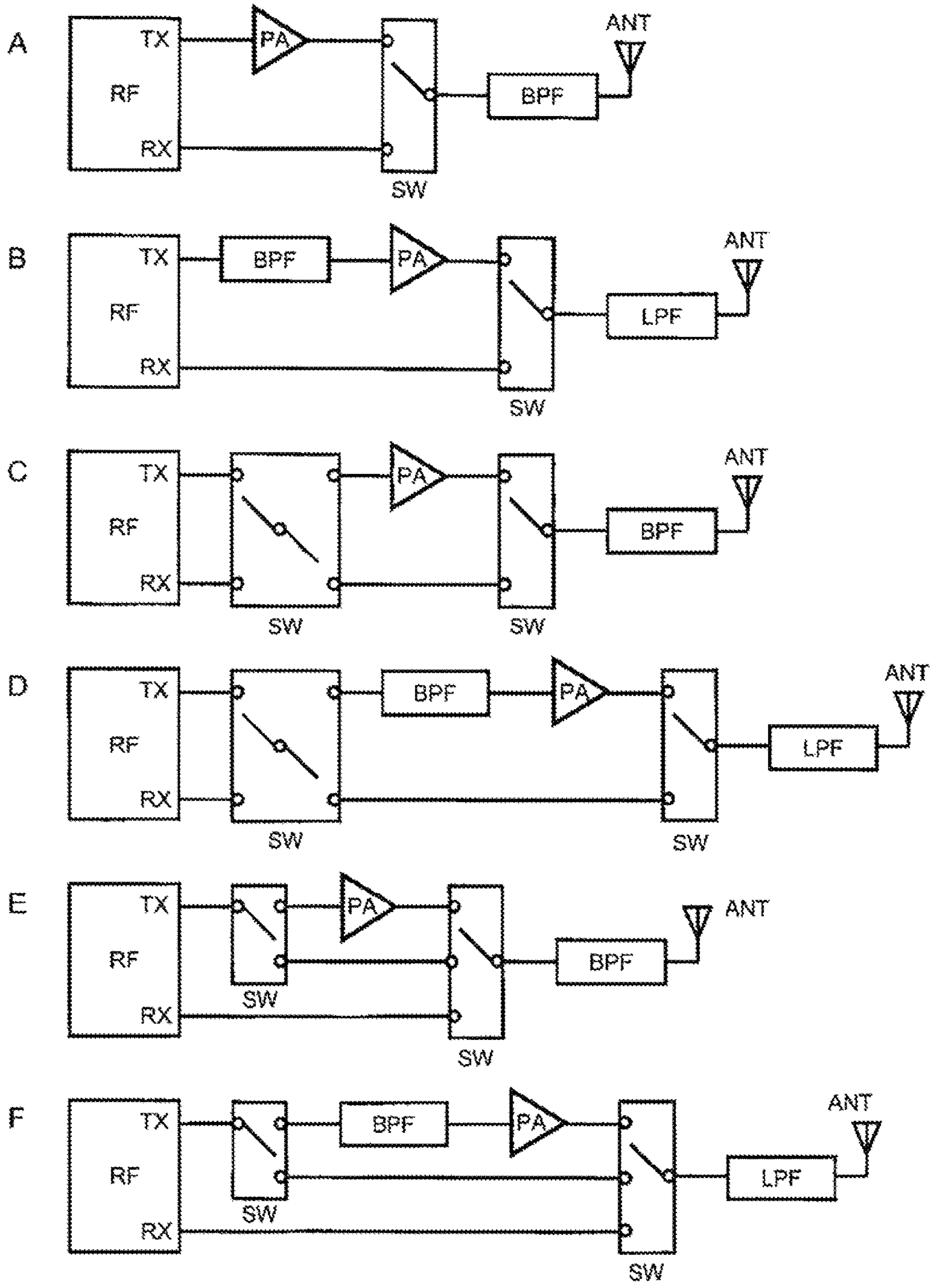

[FIG. 16]
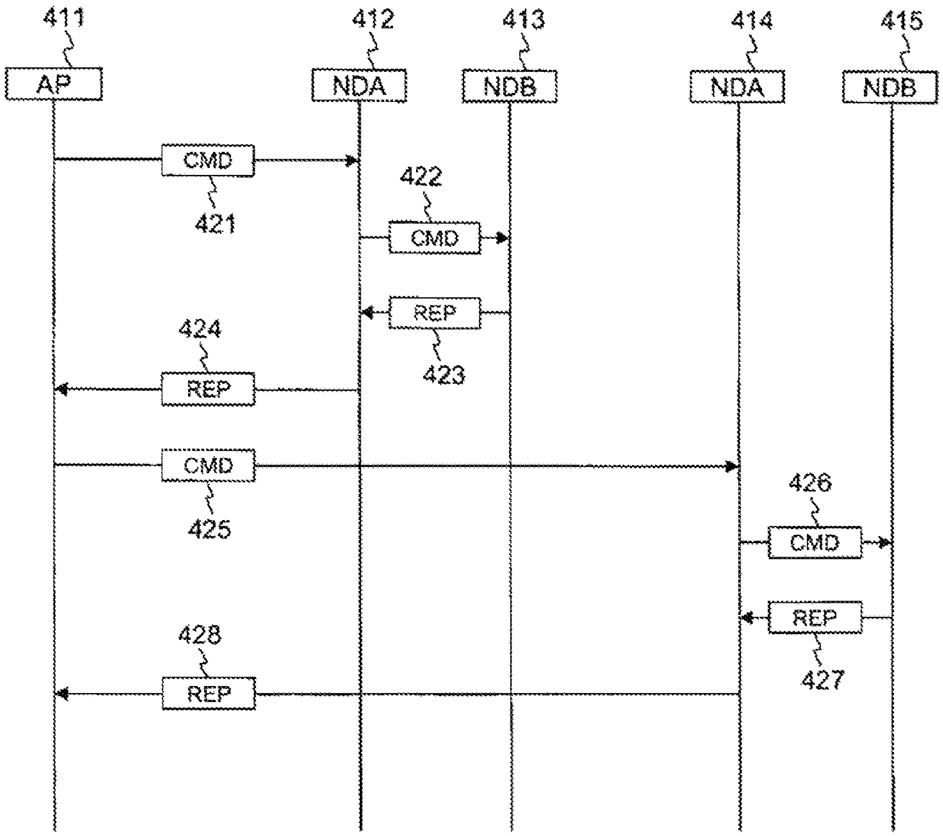

[FIG. 17]
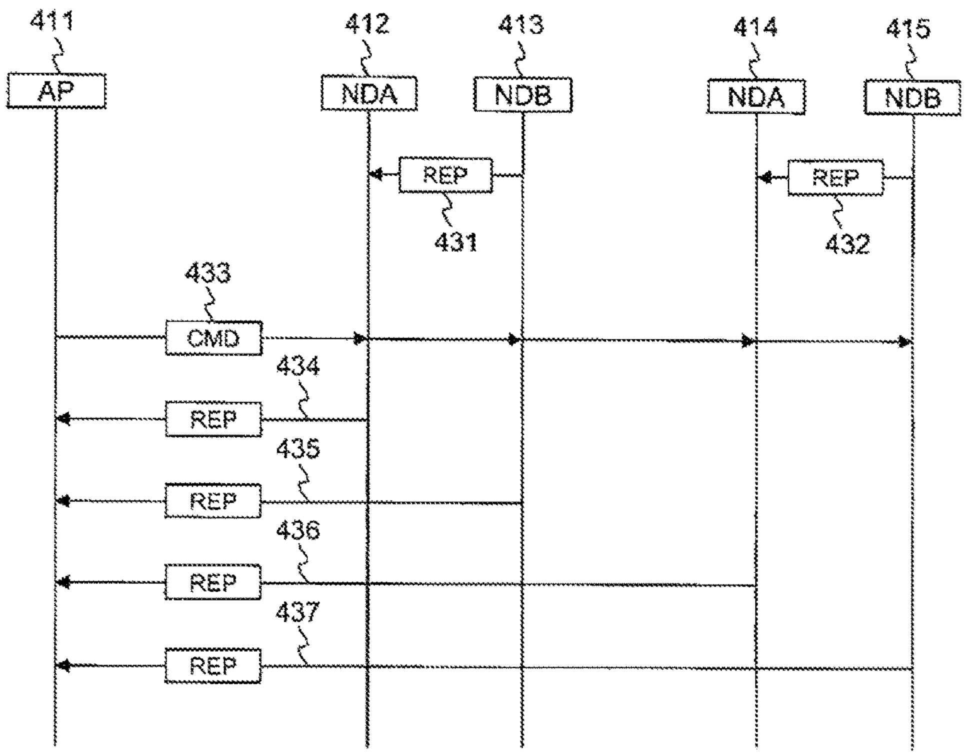

[FIG. 18]
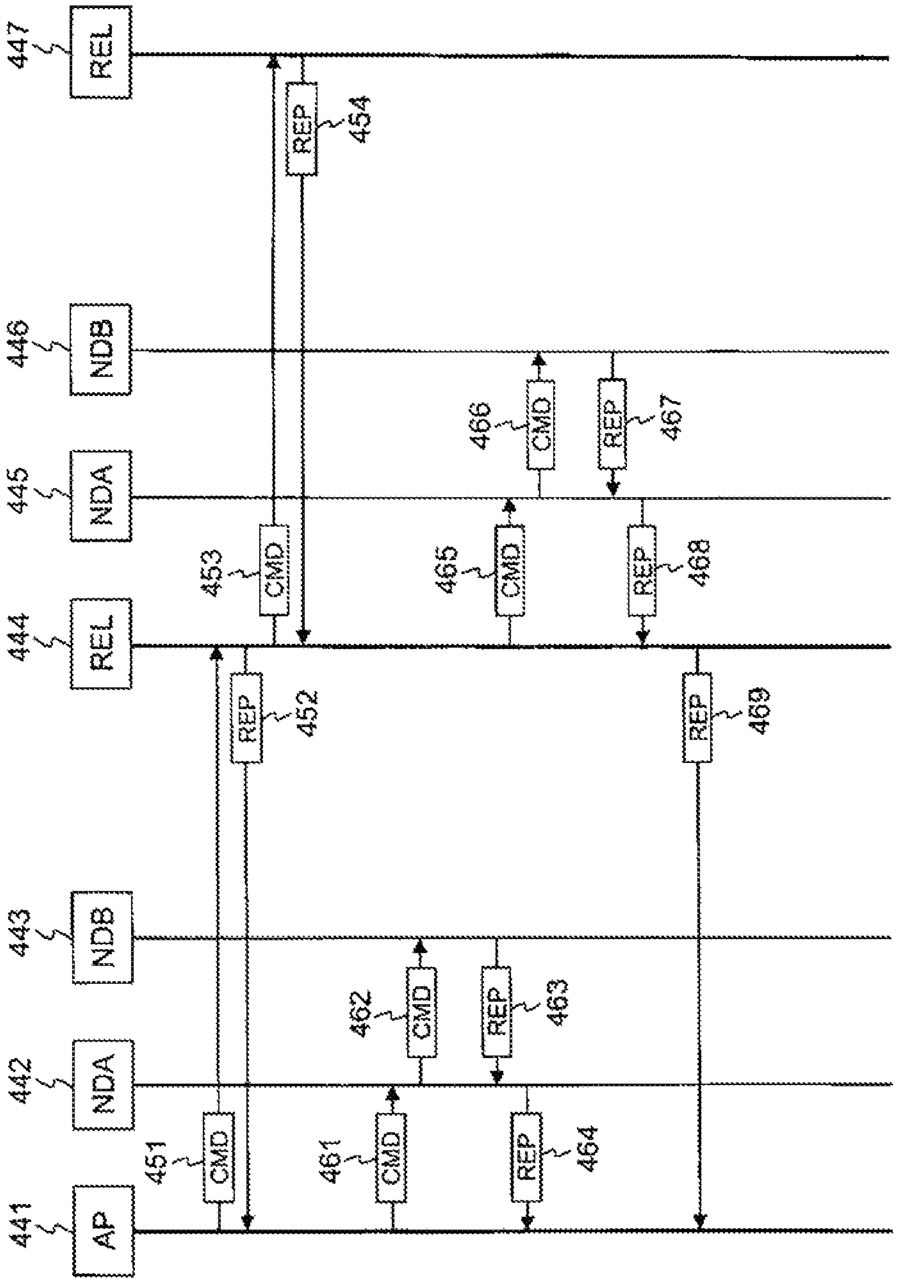

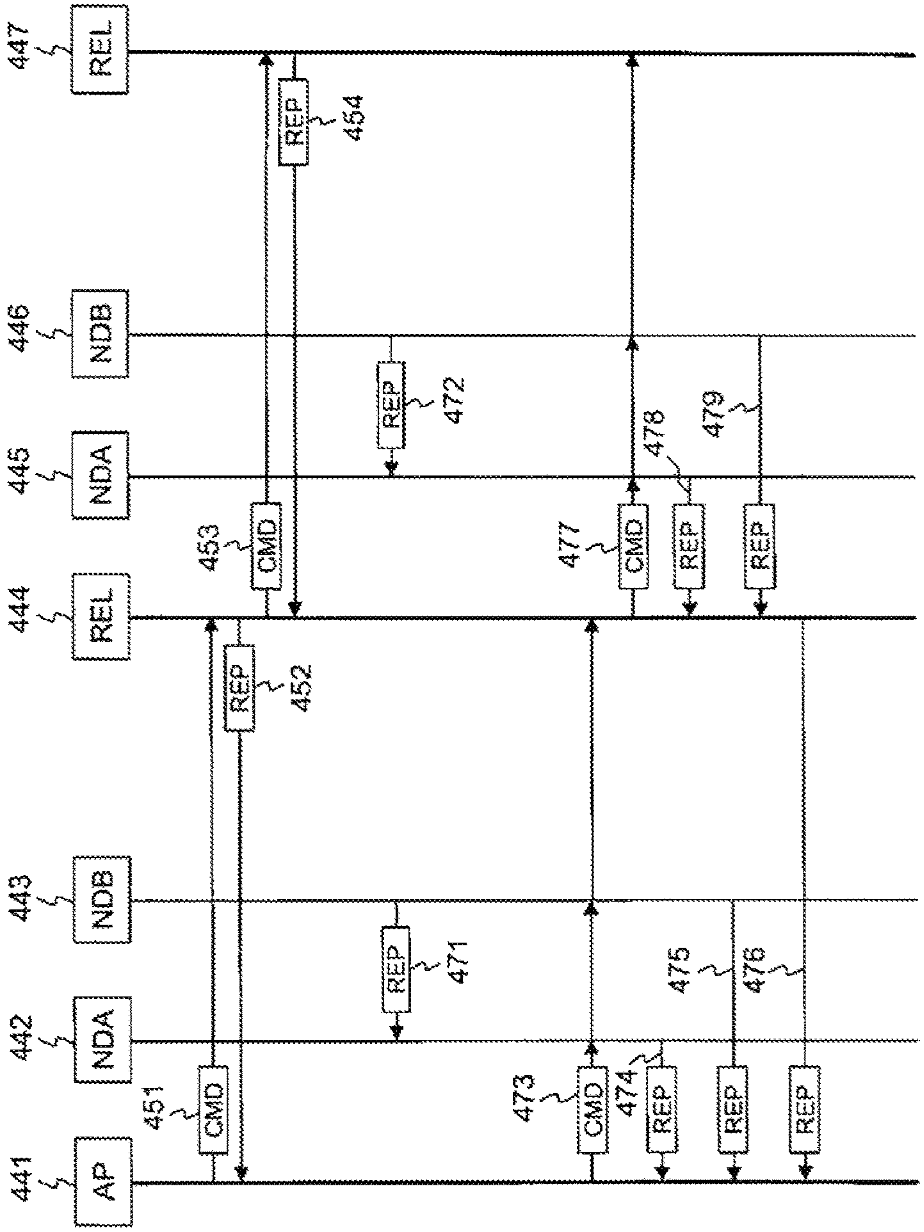
[FIG. 19]

[FIG. 20]
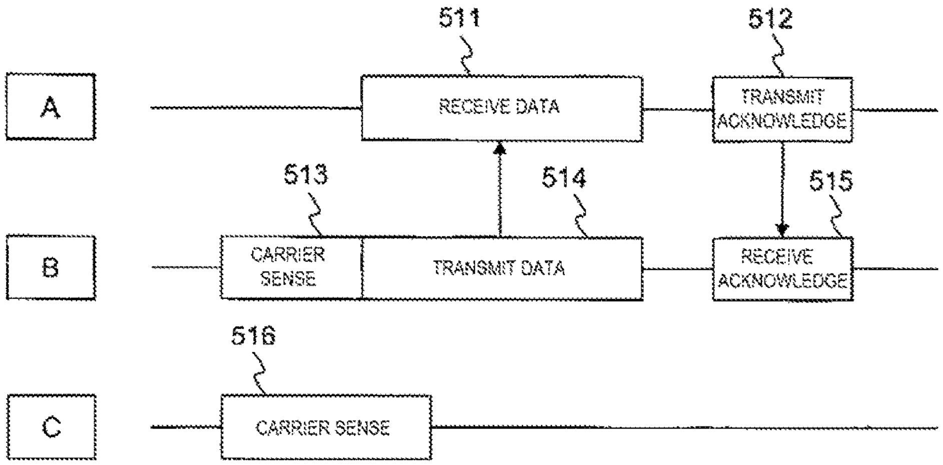

RADIO BASE STATION, RADIO COMMUNICATION NETWORK SYSTEM, AND COMMUNICATION CONTROL METHOD

TECHNICAL FIELD

The present invention relates to a radio base station, a radio communication network system, and a communication control method, and for example, relates to a radio communication network that conducts a multihop communication.

BACKGROUND ART

With growing environmental awareness in recent years, technology needs for an energy management has increased. EMS such as an HEMS (home energy management system) that conducts the energy management at home, a BEMS (building energy management system) that conducts the energy management in collective housings or buildings, or a CEMS (city energy management system) that conducts the energy management in an area of community are expected from a customer side that consumes energy. A smart meter or an AMI (advanced metering infrastructure) that automatically reads a power meter, and a smart grid that stabilizes an electric power distribution/electric power transmission system have been demanded from a power company side that generates energy, and demonstration experiments have been promoted. Further, a smart city concept of performing those techniques in urban areas together has been also studied.

In order to realize those energy-related management systems, it is essential to secure an infrastructure of communication means. There are various candidates such as a radio communication, a wired communication, an optical communication, and a power carrier communication as the communication means. It seems that suitable means is selected depending on an environment constructed as the infrastructure. Among those communications, the radio communication is excellent in terms of installation, ease of maintenance, the low cost of a device class, and scalability, and highly expected.

When the radio communication is used as the communication infrastructure means, the consideration of an installation environment is also required, and the optimization is required depending on an intended purpose. For example, in the smart meter, there is required that a large number of radio terminals conduct a communication with each other periodically (every 30 minutes) in a relatively short distance area within about several 100 m to 1 km. On the other hand, an emergency response is required in the smart grid, there is a need to conduct a long-distance communication of about 10 km at a high speed (a low delay or a short period). As an example of the emergency response, there are short-circuiting caused by a damage to electric wires, and an emergency stop of a power distribution.

When meter reading data collection of the smart meter, and device data collection of the smart grid are "steady", the emergency response in the smart grid can be regarded as "unsteady".

A communication transmission distance required for the radio communication is different in the communication between the steady situation and the unsteady situation described above. An increase in the transmission distance in the unsteady situation can be performed by increasing a transmission radio wave power of the radio communication device. However, a transmission power that enables a communication at a distance of several km is large, and a power consumption of the radio communication device also increases. Therefore, in the steady situation, it is preferable to conduct a short-distance radio communication with a small transmission power from the viewpoint of the power consumption.

As means for changing the transmission power of the radio communication, for example, PTL 1 discloses means for changing a power of a radio relay station. According to this PTL 1, when plural base stations of cellular phones are provided, and a communication traffic volume of a certain base station is high, signals of terminals present in an area of that base station are transmitted to another base station by increasing a relay station power.

Also, PTL 2 discloses means for increasing the power in the radio base station. According to this PTL 2, in a communication between the base station and the terminal, when the base station conducts an emergency call, and the radio communication does not normally operate (not connected, or not successful in communication), the base station increases the power to facilitate a connection between the base station and the terminal.

CITATION LIST

Patent Literature

PTL 1: JP-A-2010-041685
PTL 2: JP-T-2009-530972

SUMMARY OF INVENTION

Technical Problem

Since the transmission distance required for the radio communication is different between the steady situation and the unsteady situation, for example, the transmission power is enhanced in the unsteady situation to increase the transmission distance.

However, the enhancement in transmission power in the related art of PTLs 1 and 2 is conducted to respond to environments such as a position (place) or a time where no communication in the steady situation is conducted, and it is not assumed to realize the communication in the steady situation and the communication in the unsteady situation at the same position and time, simultaneously.

For that reason, in a radio communication network, it is desirable that a massive data communication is conducted at a short-distance in the steady situation, a high-speed data communication is conducted at a long distance in the unsteady situation, and the communications in the steady situation and the unsteady situation are realized by the same radio communication network means without affecting the respective communication qualities.

The present invention has been made in view of the above circumstances, and therefore an object of the present invention is to dynamically switch between a short-distance radio communication in a steady situation and a long-distance radio communication in an unsteady situation in a radio communication network, and also realize a steady communication and an unsteady communication through the same radio communication network without affecting the respective communication qualities.

Solution to Problem

In order to solve the above problem, according to the present invention, one radio communication network is configured by plural radio terminals, and a plurality of the radio communication networks is present within a radio communication network system. Also, each of the plural radio terminals is configured to operate as a radio relay station that relays received information to another radio terminal or a radio base station. The radio base station executes time synchronization of the plural radio terminals included in one radio communication network, and controls the respective radio terminals included in the radio communication networks different from each other to operate at different times. Further, the radio base station executes the time synchronization among the plural radio terminals within the radio communication network to be communicated when executing a communication in each of the plural radio communication networks.

Further, the radio base station switches a transmission radio wave power between at least a first value and a second value which is larger than the first value, and executes a communication with the plural radio terminals.

Also, in the radio communication network system, the radio terminals each include a sensor, and the radio base station variably controls the transmission radio wave power according to measurement data values by the sensors of the radio terminals, or the contents of data received in a data communication. A communicatable time is determined for each of the radio terminals (and the radio relay station) and the radio base station, and the communicatable time does not change even if the transmission radio wave power changes.

Advantageous Effects of Invention

According to the present invention, there can be provided a radio communication network device and a radio communication device, which can dynamically switch between a short-distance radio communication in a steady situation and a long-distance radio communication in an unsteady situation in a radio communication network, and also realize a steady communication and an unsteady communication through the same radio communication network without affecting the respective communication qualities. A power consumption is reduced when a short-distance radio communication is conducted, and a high speed/low delay/short time response can be realized when a long-distance radio communication is conducted.

Further features related to the present invention will become apparent from the description of the present specification and the attached drawings. Also, modes of the present invention are achieved and realized by elements, the combination of diverse elements, and the following detailed description, and the modes of the attached claims.

The description of the present specification is merely typically illustrative, and should be understood to be not intended to limit the scope of the claims or applied examples of the present invention in any way.

BRIEF DESCRIPTION OF DRAWINGS

FIG. 1 is a diagram illustrating a general configuration of a radio communication network system according to a first embodiment of the present invention.

FIG. 2 is a diagram illustrating a steady operation sequence.

FIG. 3 is a diagram illustrating an unsteady operation sequence (1).

FIG. 4 is a diagram illustrating an unsteady operation sequence (2).

FIG. 5 is a diagram illustrating a general configuration and an operating mode (1) of a radio communication network system according to a second embodiment of the present invention.

FIG. 6 is a diagram illustrating an operating mode (2) of a radio communication network system according to the second embodiment of the present invention.

FIG. 7 is a diagram illustrating an operating mode (3) of a radio communication network system according to the second embodiment of the present invention.

FIG. 8 is a diagram illustrating a steady operation sequence according to the second embodiment.

FIG. 9 is a diagram illustrating an unsteady operation sequence (1) according to the second embodiment.

FIG. 10 is a diagram illustrating an unsteady operation sequence (2) according to the second embodiment.

FIG. 11 is a flowchart illustrating the receiving operation of a radio terminal applied to the respective embodiments.

FIG. 12 is a flowchart illustrating the data transmitting operation of the radio terminal applied to the respective embodiments.

FIG. 13 is a diagram illustrating a hardware configuration of a radio communication device (radio base station, radio terminal, radio relay station) used in the respective embodiments of the present invention.

FIG. 14 is a diagram illustrating a configuration of a radio communication analog circuit of the radio communication device.

FIGS. 15A to 15F are diagrams illustrating other configuration examples of the radio communication analog circuit.

FIG. 16 is a diagram illustrating a general configuration of a radio communication network system according to a third embodiment of the present invention.

FIG. 17 is a diagram illustrating a general configuration of a radio communication network system according to a fourth embodiment of the present invention.

FIG. 18 is a diagram illustrating a general configuration of a radio communication network system according to a fifth embodiment of the present invention.

FIG. 19 is a diagram illustrating a general configuration of a radio communication network system according to a sixth embodiment of the present invention.

FIG. 20 is a diagram illustrating a communication sequence for automatically determining the priority of the radio communication described in the fourth embodiment.

DESCRIPTION OF EMBODIMENTS

The present invention relates to a technique for making a radio wave power variable to conduct a steady communication and an unsteady communication at the same time, and realize a high-speed response and a low-consumption power, in a radio communication network system including a radio communication terminal (possibly including a radio communication relay station) and a radio base station.

Hereinafter, an embodiment of the present invention will be described with reference to the attached drawings. In the attached drawings, functionally the same elements may be indicated by identical reference numerals. Although the attached drawings illustrate specific embodiments and an example of implementation according to the principle of the present invention, the attached drawings are for the understanding of the present invention and are not used in any way to restrictively interpret the present invention.

Although the present embodiment describes the present invention in detail enough for those skilled in the art to carry out the present invention, other implementations and modes are also possible, and it needs to be understood that changes in configurations and structures as well as replacements of various elements are possible without departing from the range and the spirit of the technical concept of the present invention. Therefore, the following description should not be interpreted restrictively.

(1) First Embodiment

<System Configuration>

FIG. 1 is a diagram illustrating a general configuration of a radio communication network system according to a first embodiment of the present invention.

A radio communication network system includes a radio base station AP (110), radio terminals NDA (120*a*, 120*d*, 120*g*), NDB (120*b*, 120*e*, 120*h*), and NDC (120*c*, 120*f*, 120*i*). FIG. 1 exemplifies a system in which one radio base station communicates with the radio terminals through three routes. However, the number of radio base stations, the route numbers of the radio terminals, and the number of terminals can be set arbitrarily as needed. Also, in the system, the respective radio terminals (NDA and NDB in FIG. 1) can also function as radio relay stations.

The radio base station AP and the radio terminals NDA to NDC can change transmission radio wave powers (radio wave intensity) for communication to three kinds. In the present specification, the three kinds of transmission radio wave powers are called "small power", "medium power", and "large power". For example, in a 920 MHz band, powers of 1 mW (small power), 20 mW (medium power), and 250 mW (large power) can be output, and enable a radio communication at transmission distances of about 10 to several 10 m, 100 to several 100 m, 1 k to several km, respectively. In this embodiment, three kinds of powers are exemplified. However, at least two kinds (small power and medium power, small power and large power, or medium power and large power) of powers (may be four or more kinds of powers) may be dealt with. Also, the above power values are merely exemplary, and if three kinds of power values are set, the values can be appropriately set.

In this embodiment, it is assumed that an area is divided into a short distance 151, a middle distance 152, and a long distance 153 according to a distance from the base station 110. That is, the radio terminals NDA are arranged at the short distance 151, the radio terminals NDB are arranged at the middle distance 152, and the radio terminals NDC are arranged at the long distance 153.

Also, a relationship between radio terminal positions (distances) and transmission powers is represented as follows. The radio communication is enabled between the base station AP and the radio terminals NDA of the short distance 151, between the radio terminals NDA and NDB, and between the radio terminals NDB and NDC by transmission radio waves of the small power. The radio communication is enabled between the base station AP and the radio terminals NDB of the middle distance 152, and between the radio terminals NDA and NDC by the transmission radio waves of the medium power. The radio communication is enabled between the base station AP and the radio terminals NDC of the long distance 153 by the transmission radio waves of the large power.

In this embodiment, for example, a smart meter is assumed as a steady operation of the radio communication network device. In the smart meter, the radio terminals are connected to a power meter, and a meter reading value is periodically transmitted to the base station. The meter data may transmit the meter reading value as a response signal of the radio terminal to a command signal from the radio base station, or the radio terminal may periodically acquire the meter data by a timer, and transmit the meter data, and the base station returns a data receiving acknowledgement as a procedure.

In the operation of the radio communication network such as the smart meter (first operating mode), a large-scale (a number of) radio terminals need to transmit data in a given time (for example, 30 minutes). In order to conduct large-scale management with the avoidance of interference of the radio waves with each other, it is preferable that the transmission radio wave power is smaller, and the small-power radio waves are used. In this operation, as indicated by a network of AP (110), NDA (120*a*), NDB (120*b*), and NDC (120*c*), communications are conducted between the respective radio terminals, and NDA and NDB also function as the radio relay stations, and transmit data to the base station AP.

On the other hand, as the unsteady operation of the radio communication network system, there are a control signal transmission to the respective radio terminals, and an abnormal measurement data of the respective radio terminals. For example, in a smart grid control, various equipments for power transmission and distribution are connected to the respective radio terminals. As an example, there are a switch (power switch), a voltage generator, and a reactive power regulator. For those equipments, a control signal is transmitted to the radio terminals through the radio base station so as to remotely control the operation of the respective equipments. In a situation where a supply-demand balance of the electric power is parlous, if a power consumption precipitously increases, and the power generation is not purveyed, it is also desirable that the switch turn off instantaneously. Therefore, a signal transmission for control needs to be conducted with a low delay (or high speed, short time).

Likewise, the various equipments for smart grid periodically monitor their states for monitoring the operating status, and transmit status measurement data to the radio base station. In the collection of the state measurement data, if the data value is normal, the radio terminals can be mixed on the same system as that of the smart meter. However, if the data value is indicative of abnormality, the radio terminals transmit the abnormal data to the radio base station with the low delay (or high speed, short time), and are further required to receive feedback from the radio base station.

In the network of AP (110), NDA (120*d*), NDB (120*e*), and NDC (120*f*) illustrated in FIG. 1 (second operating mode), in order to rapidly transmit a signal from the radio base station AP, the transmission power of the radio base station AP is set to a large power. The signal of the radio base station AP arrives at all of those three areas of the radio terminals NDA (120*d*), NDB (120*e*), and NDC (120*f*) at one time. When the control signal is transmitted, if there is no time limit to the return of acknowledgment, because the steady operation coexists, the small power is selected. That is, the large power is output in a downlink (downlink) transmission from the base station AP toward a direction of the radio terminals, and the small power is output in an uplink (uplink) transmission in the reverse direction.

In the network of AP (110), NDA (120*g*), NDB (120*h*), and NDC (120*i*) (third operating mode), a reciprocating signal transmission is conducted between a radio communication base station and the respective radio terminals with a low delay. The signal of the radio base station AP arrives at all of those three areas of the radio terminals NDA (120*g*), NDB (120*h*), and NDC (120*i*) at one time. Since the radio terminal NDA (120*g*) is present in the area of the short distance 151, the radio terminal NDA (120*g*) can return the signal to the radio base station AP even with the small power. Since the radio terminal NDB (120*h*) is present in the middle distance 152, if the radio terminal NDB (120*h*) transmits the signal with the medium power, the signal can be returned directly to the radio base station AP. Since the radio terminal NDC (120*i*) is present in the area of the long distance 153, if the radio terminal NDC (120*i*) transmits the signal with the high power, the signal can be returned directly to the radio base station AP. For example, if an abnormal value is detected in any one of the radio terminals, the signal is rapidly transmitted to the base station, and the control signal from the base station needs to be received by the radio terminal, this system in which both of the uplink and the downlink can be connected directly to the radio base station is suitable for such a case.

In the radio communication system illustrated in FIG. 1, the operating modes (a) to (c) are implemented while switching appropriately in the respective routes. With this operation, the radio communication system can operate appropriately while being adapted to the steady situation and the unsteady situation. In the respective operating methods, there are a case in which the operating mode is switched according to a request from the radio terminals NDA to NDC (the radio terminal functions as a trigger), and a case in which the operating mode is switched according to a control by the radio base station (the radio base station functions as a trigger). In the former example, the following case is considerable. That is, the amount of power supply (the amount of power sale) generated by solar cells from each household is measured in each power pole, and if the amount of power supply extremely increases, the power supply from a wire side is not stabilized. As a hazardous state in that case is detected, and transferred to a power company side, and the switch in the power pole is opened once to control the power transmission, to thereby stabilize the power supply. In this case, the mode is switched from the operating mode (a) to the operating mode (b) or (c) in FIG. 1. On the other hand, in the latter example, the following case is considerable. That is, when the base station collects the various data from the respective radio terminals in the steady situation (operating mode (a)), if data from a certain radio terminal cannot be received with some failure, or if the switch associated with a certain radio terminal turns off, the base station actively switches the operating mode from (a) to (b) or (c), and transmits the control signal to the respective radio terminals.

<Sequence in Steady Operation>

FIG. 2 is a diagram illustrating a sequence of a steady operation in a radio communication network device (operating mode (a)).

Referring to FIG. 2, vertical lines led extended from the respective radio communication devices (AP, NDA, NDB, NDC) represent the passage of time, and a time of a lower portion is later. Horizontal arrows connecting between the vertical lines indicative of the passage of time indicate radio signals between the respective radio communication devices, and directions thereof.

In the steady operation, because the short-distance communication is conducted wirelessly with the small power, a command signal CMD (COMMAND) from the radio base station is transmitted in the order of the radio base station AP (110), the radio terminal NDA (120*a*), the radio terminal NDB (120*b*), and the radio terminal NDC (120*c*) by multi-hop (time 161). A response signal REP (REPLY) from the radio terminals to the radio base station is transmitted in the reverse order, that is, in the order of NDC, NDB, NDA, and AP (time 162).

The transmission timing of the respective signals is managed in time, and if one communication is conducted in a determined time, the respective communications are prevented from overlapping with each other to generate an interference. If a so-called TDMA (time division multiple access) is conducted, the system can be efficiently configured. Even if the TDMA is not necessarily used, a multiplexing system such as an FDMA (frequency division multiplexing access) or a CSMA (carrier sense multiplexing access) may be used.

Immediately after the respective command signals or the response signals, the respective radio devices may return an acknowledge signal for the signal receiving acknowledgement. Likewise, immediately before the respective command signals or the response signals, a carrier sense that the radio wave measurement (reception) is conducted, and if the radio waves are absent, the signal is transmitted, and if the radio waves are output in another radio device, the signal is not temporarily transmitted, may be inserted. Also, sequence time domains 161 and 162 may be reversed in order, or may be conducted plural times. As the response signal, each of REP 136, 135, and 134 can transmit data for the plural radio terminals. For example, the REP 135 may transmit only data of the NDB 120*b*, but may include data of data REP 136 in the NDC 120*c*.

As the steady operation, there are a case in which the REP is transmitted from the respective radio terminals to the base station after the CMD is transmitted from the base station to the respective radio terminals, and a case in which the REP is transmitted from the respective radio terminals to the base station, and the CMD is transmitted to the respective radio terminals from the base station at a given timing. In the former case, the base station transmits a command (CMD) for instructing the respective radio terminals to transmit various data to the respective radio terminals at every 30 minutes. In response to this command, the respective radio terminals transmit appropriate data (REP). In the latter case, each of the radio terminals has a timer, and the respective radio terminals transmit the various data to the base station at every 30 minutes. The base station transmits, for example, data for time adjustment at a given timing (regardless of the reception of various data). If the base station cannot receive various data, the base station requests the radio terminal in question to retransmit data. Whether the operating mode (b) (refer to FIG. 3), or the operating mode (c) (refer to FIG. 4) to be selected depends on an importance level of data that could not be received. For example, if a contract for a power reading meter with a power company is a special high voltage contract, because data must be always received, the measurement data in that case becomes higher in the importance level, and the transmission and reception of data are controlled by the operating mode (c).

<Sequence in Unsteady Operation (1)>

FIG. 3 is a diagram illustrating a sequence of an unsteady operation in the radio communication network system (operating mode (b)).

In the control signal transmission from the base station, the operating mode (b) is used when a very high speed is not required for a reply response. For example, the amount of power supply generated by solar cells in each household described above gradually increases, but does not exceed a given threshold value, FIG. 3 (operating mode (b)) is used.

The base station AP (110) outputs the high power in the downlink, and transfers a command signal 141 to all of the radio terminals NDA (120*d*), NDB (120*e*), and NDC (120*f*) at the same time at once. All of reply signals are output with the low power.

A transmission time allocation for the unsteady operation is identical with that for the steady operation of FIG. 2, and both of those operations can coexist. If the unsteady operation is to be prioritized in the system of the steady operation, or if a quick reply is desirable, a time slot immediately after the command signal transmission from the radio base station is used for the reply signal transmission. Alternatively, a carrier sense time may be shortened only in the signal transmission requiring the low delay transmission. In this method, the terminal having the carrier sense time shortened can be preferentially transmitted when the time allocation overlaps with each other.

The sequence time domains 163 (the same interval as that of the time 161) and 164 may be reversed in order, or may be conducted plural times. Also, the time domain 163 may be made shorter than the time domain 161 (refer to FIG. 2).

<Sequence in Unsteady Operation (2)>

FIG. 4 is a diagram illustrating an unsteady operation sequence (operating mode (c)) of the radio communication network device.

This operating mode is used when the radio terminal measures abnormal data, and transfers the abnormal data to the radio base station at a high speed, and needs to receive the control signal from the radio base station immediately. For example, FIG. 4 (operating mode (c)) is used when the amount of power supply generated by solar cells in each household described above exceeds a given threshold value, or when the wire is disconnected for some reason, the radio terminal (NDC) notifies the base station of this fact through the long-distance communication when short-circuiting is conducted, and the base station controls the radio terminals (the switch turns off).

The base station AP (110) outputs the high power in the downlink, and transfers a command signal 145 to all of the radio terminals NDA (120*g*), NDB (120*h*), and NDC (120*i*) at the same time at once. The power of the reply signal (or data transmission signal) is regulated so as to reach the radio base station AP, directly. The radio terminal NDA conducts a communication of the small power, the radio terminal NDB conducts a communication of the medium power, and the radio terminal NDC conducts a communication of the large power.

A transmission time allocation for the unsteady operation is identical with that for the steady operation of FIG. 2, and both of those operations can coexist. If the unsteady operation is to be prioritized in the system of the steady operation, or if a quick reply is desirable, a time slot immediately after the command signal transmission from the radio base station is used for the reply signal transmission. Alternatively, a carrier sense time may be shortened only in the signal transmission requiring the low delay transmission. In this method, the terminal having the carrier sense time shortened can be preferentially transmitted when the time allocation overlaps with each other.

The sequence time domains 165 and 166 may be reversed in order, or may be conducted plural times.

<Operation of Radio Terminals (Reception Standby)

FIG. 11 is a flowchart illustrating the operation (reception standby) of the radio terminal in the first embodiment, and the respective embodiments to be described later.

The respective radio terminals change the transmission powers according to the contents of the command signal from the base station. The respective radio terminals use the low power (Step 213) if the command signal from the base station is a steady communication (Step 212). If the command signal is an unsteady communication, the respective radio terminals set the transmission power to the mediate power or the high power (Step 216) according to a position of the radio terminals (Step 215), and transmit the command signal directly to the radio relay station or the radio base station (Step 217). The setting of the low power, the medium power, and the high power can be determined in advance according to the installation position of the radio terminals. Alternatively, a received radio wave intensity or a reception success rate of the high power signal from the base station is measured by the radio terminals, and the transmission power may be automatically set according to the measured value.

The operation of the radio base station is substantially identical with that of the radio terminals, but only the high power is set in Step 216.

<Operation of Radio Terminals (in Measurement)>

FIG. 12 is a flowchart illustrating the operation (in data measurement) of the radio terminal in the first and respective embodiments to be described later.

A threshold value is set for the measurement value of the sensor included in or connected to each of the radio terminals. Each of the radio terminals determines that the measurement value is normal if the measurement value is higher or lower than the threshold value, and determines that the measurement value is abnormal in other cases (Step 222). If the measurement data is an abnormal value, each of the radio terminals sets the transmission power to the medium power or the high power (Step 225), and transmits the data directly to the radio base station or the radio relay station (Step 226). If the measurement data is normal, each of the radio terminals sets the transmission power to the low power (Step 223), and transmits the measurement value to a proximity radio terminal (Step 224).

<Internal Configuration of Radio Communication Device>

FIG. 13 is a diagram illustrating a general configuration example of the radio communication device of the radio base station, the radio terminal, and the radio relay station in the first and respective embodiments to be described later according to the present invention. The radio base station, the radio terminals, and the radio relay station are identical in hardware configuration with each other, and different in only software configuration (operation) from each other.

The radio communication device includes a power circuit POW (311), a timer TIM (312), a power switch PSW (313), a sensor SEN (314), a microcomputer MIC (315), a radio circuit RF (316), an amplifier circuit PAC (317), a switch SW (318), a band pass filter BPF (319), and an antenna ANT (321).

The power circuit POW supplies a power to the timer TIM. The timer TIM measures a time, and supplies the power to the power switch PSW. Also, the timer TIM controls the start and stop (sleep) of the sensor SEN or the microcomputer MIC. The power switch PSW supplies the power to the sensor SEN, the microcomputer MIC, the radio circuit RF, the amplifier circuit PAC, and the switch SW. The power switch PSW can control the supply and disconnection of the power for each of the circuits, independently. The sensor SEN transmits the measurement data from the sensor to the microcomputer MIC. The microcomputer MIC transmits the control signals such as a start signal or a cutoff signal to the power switch PSW, the radio circuit RF, the amplifier circuit PAC, and the switch SW. Also, the microcomputer MIC transmits data to be wirelessly transmitted to the radio circuit RF, and processes the data received by the radio circuit RF by the microcomputer MIC. The radio circuit RF converts transmission data received from the microcomputer MIC into a radio wave, and outputs the radio wave. In the radio circuit RF, TX indicates a transmission terminal, and RX indicates a reception terminal. The amplifier circuit PAC amplifies a signal power received from the radio circuit RF into a large power. The amplifier circuit PAC includes plural switches SWA, SWB, and an amplifier PA. When the amplifier PA is used, SWA turns on, and SWB turns off to supply the power to the PA. When the amplifier PA is not used, the SWA turns off, and SWB turns on so that the radio signal passes therethrough. The switch SW turns on according to the control signal of the microcomputer MIC, and transmits a TX output from the radio circuit RF to the band pass filter BPF and the antenna ANT in the radio transmission.

The radio communication device enables the switching of the transmission output and the reduction of the power consumption according to an autonomous determination of the microcomputer MIC. Also, when the radio communication device is used for periodic communication, the power supply of other configuration circuits is cut off with the user of the timer TIM, to thereby enable the power consumption to be further reduced.

For example, the radio communication device transmits the measurement data of the sensor SEN to the microcomputer MIC, and determined whether the amplifier PA is used or unused, according to the comparison results of the data value with the threshold value. Alternatively, the received data through the radio communication is determined by the microcomputer MIC, and the microcomputer MIC selects the power as occasion demands.

In the circuit block of the radio communication device in FIG. 13, the radio circuit RF, the amplifier circuit PAC, the switch SW, the band pass filter BPF, and the antenna ANT collectively configure a radio communication analog circuit. FIGS. 14 and 15 are diagrams illustrating a configuration example of the radio communication analog circuit part.

The radio communication analog circuit is basically configured by the combination of the radio circuit RF, the amplifier circuit PAC (or amplifier PA), the switch SW, the band pass filter BPF, the antenna ANT, and a low pass filter LPF as needed.

In the radio communication analog circuit of FIG. 14, many filter classes are used for the purpose of suppressing unnecessary radiation. Because the filter class increases a loss (attenuation) of the signal power in the radio communication analog circuit, it is better to reduce the filter classes. As described from a left of FIG. 14, the unnecessary radiation of the output of the radio circuit RF is suppressed by an initial low pass filter LPF. In order to again suppress the unnecessary radiation through the switch, the band pass filter BPF or the low pass filter is used. The band pass filter BPF is used to suppress the unnecessary radiation of the amplifier PA particularly for realizing the high power in advance. It is highly effective to use the band pass filter BPF in the rear (on the right side) of the amplifier PA. However, when the large power of the amplifier PA is connected to the band pass filter BPF, an available life of the band pass filter may become shorter. In order to prolong the life, it is preferable that the band pass filter is arranged in a preceding stage (left side). In that case, the low pass filter LPF is further arranged on the right side of a rear stage of the amplifier PA. Further, the band pass filter and the low pass filter are arranged between the switch and the antenna ANT. This arrangement can suppress the unnecessary radiation of the transmission, and also has an advantage that the unnecessary electric wave is not propagated to the radio circuit RF in the reception. If a large number of filters are used in this arrangement, the unnecessary radiation is suppressed. However, in fact, a necessary radio power is also affected by the suppression, and the number or the combination of the filters can be diversely conceived taking an influence of the suppression on the circuit scale or the costs into account.

FIGS. 15A to 15F illustrate configuration examples of the radio communication analog circuit in which the combination of the filter and the switch is changed. The combination has the following characteristics.

A configuration of FIG. 15A has advantages that a signal attenuation is low, the circuit scale is small, and another radio receiving noise is reduced. However, because the high power is input to the band pass filter, the life is shortened.

A configuration of FIG. 15B is advantageous in terms of the circuit scale, the signal attenuation, and the band pass filter life. However, this configuration is susceptible to the noise of another radio in the reception.

A configuration of FIG. 15C is excellent in terms of resistances to the signal attenuation and another radio receiving noise, but the life of the band pass filter is shortened.

In a configuration of FIG. 15D, the band pass filter is hardly affected, but there are many drawbacks from the other viewpoints.

A configuration of FIG. 15E is excellent in terms of the signal attenuation and another radio noise, but the life of the band pass filter is affected.

In a configuration of FIG. 15F, the band pass filter is hardly affected, but an influence of another radio noise is large.

(2) Second Embodiment

<Configuration of System>

FIGS. 5 to 7 are diagrams illustrating a general configuration example of a radio communication network system according to a second embodiment of the present invention. FIGS. 5 to 7 illustrate a connection relationship of a base station, radio terminals, and a radio relay station in only one route. However, the number of routs, and the number of radio terminals between the radio relay stations are arbitrary.

When the radio communication devices are arranged along a wire by a smart grid, a required distance becomes long, that is, several 10 km. In this case, the number of multihop may increase. However, the notification to an end radio terminal is largely delayed by merely adding the multihop.

Under the circumstances, as illustrated in FIG. 5, radio relay stations REL are installed at given intervals. As described above, the installation intervals are arbitrary, and can be appropriately regulated.

It is assumed that the radio relay station is a radio communication device that enables a long-distance communication with a high power. The same operation as that in FIG. 1 is conducted between the radio relay stations (for example, between REL 170*a* and REL 170*aa*).

Referring to FIG. 5, the radio terminals NDA (120*a*, 120*aa*, . . . ) and the NDB (120*b*, 120*bb*, . . . ) are configured to also serve as the radio relay station. Also, the radio relay stations (170*a*, 170*aa*, . . . ) mainly function as the signal relay function, but may also have the function of the radio terminals.

The radio base station and the respective radio terminals can change transmission radio wave powers (radio wave intensity) for communication to three kinds. In the present specification, the three kinds of transmission radio wave powers are called “small power”, “medium power”, and “large power”. For example, in a 920 MHz band, powers of 1 mW (small power), 20 mW (medium power), and 250 mW (large power) can be output, and enable a radio communication at transmission distances of about 10 to several 10 m, 100 to several 100 m, 1 k to several km, respectively.

It is assumed that an area is divided into a short distance 151, a middle distance 152, and a long distance 153 according to a distance from the radio base station (110). The radio terminal NDA (120*a*) is arranged at the short distance 151, the radio terminal NDB (120*b*) is arranged at the middle distance 152, and the radio terminal NDC (120*c*) is arranged at the long distance 153. Likewise, an area is divided into a short distance 151, a middle distance 152, and a long distance 153 according to a distance from a radio relay station (170*a*). The radio terminal NDA (120*aa*) is arranged at the short distance 151, the radio terminal NDB (120*bb*) is arranged at the middle distance 152, and the radio terminal NDC (120*cc*) is arranged at the long distance 153. Hereinafter, a relationship between the radio base station (110) and the radio terminals (120*a*, 120*b*, 120*c*) is identical with a relationship between the radio relay station (170*a*) and the radio terminals (120*aa*, 120*bb*, 120*cc*).

Also, a relationship between radio terminal positions (distances) and transmission powers is represented as follows. The radio communication is enabled between the radio base station AP and the radio terminals NDA of the short distance 151, between the radio terminals NDA and NDB, and between the radio terminals NDB and NDC by transmission radio waves of the small power. The radio communication is enabled between the radio base station AP and the radio terminals NDB of the middle distance 152, and between the radio terminals NDA and NDC by the transmission radio waves of the medium power. The radio communication is enabled between the radio base station AP and the radio terminals NDC of the long distance 153 by the transmission radio waves of the large power.

For example, a smart meter is assumed as a steady operation of the radio communication network device. In the smart meter, the radio terminals are connected to a power meter, and a meter reading value is periodically transmitted to the base station. The meter data may transmit the meter reading value as a response signal of the radio terminal to a command signal from the radio base station, or the radio terminal may periodically acquire the meter data by a timer, and transmit the meter data, and the base station returns a data receiving acknowledgement as a procedure.

In the operation of the radio communication network such as the smart meter, a large-scale (a number of) radio terminals need to transmit data in a given time (for example, 30 minutes). In order to conduct large-scale management with the avoidance of interference of the radio waves with each other, it is preferable that the transmission radio wave power is smaller, and the small-power radio waves are used. In this operation, as indicated by a network of AP (110), NDA (120*a*), NDB (120*b*), and NDC (120*c*), communications are conducted between the respective radio terminals, and NDA and NDB also function as the radio relay stations, and transmit data to the radio base station AP.

On the other hand, as the unsteady operation of the radio communication network device, there are a control signal transmission to the respective radio terminals, and an abnormal measurement data of the respective radio terminals.

For example, in a smart grid control, various equipments for power transmission and distribution are connected to the respective radio terminals. As an example, there are a switch (power switch), a voltage generator, and a reactive power regulator. For those equipments, a control signal is transmitted to the radio terminals through the radio base station so as to remotely control the operation of the respective equipments. In a situation where a supply-demand balance of the electric power is parlous, if a power consumption precipitously increases, and the power generation is not purveyed, it is also desirable that the switch turn off instantaneously. Therefore, a signal transmission for control needs to be conducted with a low delay (or high speed, short time).

Likewise, the various equipments for smart grid periodically monitor their states for monitoring the operating status, and transmit status measurement data to the radio base station. In the collection of the state measurement data, if the data value is normal, the radio terminals can be mixed on the same system as that of the smart meter. However, if the data value is indicative of abnormality, the radio terminals transmit the abnormal data to the radio base station with the low delay (or high speed, short time), and are further required to receive feedback from the radio base station.

In the network of AP (110), NDA (120*d*), NDB (120*e*), and NDC (120*f*) illustrated in FIG. 6, in order to rapidly transmit a signal from the radio base station AP, the transmission power of the radio base station AP is set to a large power. (Hereinafter, a relationship of the radio base station 110, and the radio terminals 120*d*, 120*e*, 120*f* is identical with a relationship between the radio base station 170*b* and the radio terminals 120*dd*, 120*ee*, 120*ff*.) The signal of the radio base station AP arrives at all of those three areas of the radio terminals NDA (120*d*), NDB (120*e*), and NDC (120*f*) at one time. When the control signal is transmitted, if there is no time limit to the reply of acknowledgment, because the steady operation coexists, the small power is selected. That is, the large power is output in a downlink (downlink) transmission from the radio base station AP toward a direction of the radio terminals, and the small power is output in an uplink (uplink) transmission in the reverse direction.

In the network of AP (110), NDA (120*g*), NDB (120*h*), and NDC (120*i*) in FIG. 7, a reciprocating signal transmission is conducted between a radio communication base station and the respective radio terminals with a low delay. (Hereinafter, a relationship of the radio base station 110, and the radio terminals 120*g*, 120*h*, 120*i* is identical with a relationship between the radio base station 170*c* and the radio terminals 120*gg*, 120*hh*, 120*ii*.) The signal of the radio base station AP arrives at all of those three areas of the radio terminals NDA (120*g*), NDB (120*h*), and NDC (120*i*) at one time. Since the radio terminal NDA (120*g*) is present in the area of the short distance 151, the radio terminal NDA (120*g*) can return the signal to the radio base station AP even with the small power. Since the radio terminal NDB (120*h*) is present in the middle distance 152, if the radio terminal NDB (120*h*) transmits the signal with the medium power, the signal can be returned directly to the radio base station AP. Since the radio terminal NDC (120*i*) is present in the area of the long distance 153, if the radio terminal NDC (120*i*) transmits the signal with the high power, the signal can be returned directly to the radio base station AP. For example, if an abnormal value is detected in any one of the radio terminals, the signal is rapidly transmitted to the base station, and the control signal from the base station needs to be received by the radio terminal, this system in which both of the uplink and the downlink can be connected directly to the radio base station is suitable for such a case.

<Sequence in Steady Operation>

FIG. 8 is a diagram illustrating a sequence of a steady operation of the radio communication network device (corresponding to FIG. 5).

Vertical lines extended from the respective radio communication devices (AP, NDA, NDB, NDC) represent the passage of time, and a time of a lower portion is later.

Horizontal arrows connecting between the vertical lines indicative of the passage of time indicate radio signals between the respective radio communication devices, and directions thereof.

In the steady operation, a communication is connected between the base station 110 and the relay stations 170*a*, 170*aa* with a radio communication of the high power. A command signal 130*a* from the base station 110 is transferred directly to the radio relay station 170*a*, and a command signal 130*c* is transferred from the radio relay station 170*a* to 170*aa*. A reply signal is returned from 170*a* to 110 as 130*b*, and also from 170*aa* to 170*a* as 130*d* (time 167). When all of the routes are sequentially communicated by the radio of the small power, this sequence is not always present.

In the steady operation, because the short-distance communication is conducted wirelessly with the small power, a command signal CMD from the radio base station is transmitted in the order of the radio base station AP (110), the radio terminal NDA (120*a*), the radio terminal NDB (120*b*), and the radio terminal NDC (120*c*) by multihop (time 168). A response signal REP from the radio terminals to the radio base station is transmitted in the reverse order, that is, in the order of NDC, NDB, NDA, and AP (time 169). (Hereinafter, a relationship of the base station (110), and the radio terminals (120*a*, 120*b*, 120*c*) is identical with a relationship between the radio base station (170*a*) and the radio terminals (120*aa*, 120*bb*, 120*cc*)).

The order of the times 167, 168, and 169 can be replaced with another, and the times 167, 168, and 169 can be also generated plural times.

The transmission timing of the respective signals is managed in time, and if one communication is conducted in a determined time, the respective communications are prevented from overlapping with each other to generate an interference. If a so-called TDMA (time division multiple access) is conducted, the system can be efficiently configured. Even if the TDMA is not necessarily used, a multiplexing system such as an FDMA (frequency division multiplexing access) or a CSMA (carrier sense multiplexing access) may be used.

Immediately after the respective command signals or the response signals, the respective radio devices may return an acknowledge signal for the signal receiving acknowledgement. Likewise, immediately before the respective command signals or the response signals, a carrier sense that the radio wave measurement (reception) is conducted, and if the radio waves are absent, the signal is transmitted, and if the radio waves are output in another radio device, the signal is not temporarily transmitted, may be inserted. Also, the time domains 161 and 162 corresponding to FIG. 2 within a sequence time domain 168 or 169 may be reversed in order, or may be conducted plural times. As the response signal, each of REP 136, 135, and 134 can transmit data for the plural radio terminals. For example, the REP 135 may transmit only data of the NDB 120*b*, but may include data of data REP 136 in the NDC 120*c*.

The radio relay station (170*a*) returns the reply signal from the terminals (120*aa*, 120*bb*, 120*cc*) to the base station (110) as REP 130*bb* in bulk. Alternatively, the radio relay station (170*a*) can return the reply signal to the base station (110) through the terminals (120*c*, 120*b*, 120*a*) with the small power.

<Sequence in Unsteady Operation (1)>

FIG. 9 is a diagram illustrating a sequence of an unsteady operation in the radio communication network system (corresponding to FIG. 6) according to the second embodiment. In the control signal transmission from the base station, the operating mode is used when a very high speed is not required for a reply response.

A communication is connected between the radio base station (110) and the radio relay stations (170*b*, 170*bb*) with a radio communication of the high power. A command signal (CMD) 141 from the radio base station (110) is transferred directly to the radio relay station (170*b*), and a command signal 141*a* is directly transmitted from the radio relay station (170*b*) to the relay station (170*bb*). A reply signal is returned from the radio relay station (170*b*) to the base station (110) as the reply signal REP 130*e*, and also from the radio relay station (170*bb*) to the radio relay station (170*b*) as the reply signal REP 130*f* (time 171). When all of the routes are sequentially communicated by the radio of the small power, this sequence is not always present.

The base station AP (110) outputs the high power in the downlink, and transfers a command signal 141 to all of the radio terminals NDA (120*d*), NDB (120*e*), and NDC (120*f*) at the same time at once. All of reply signals are output with the low power.

A transmission time allocation for the unsteady operation is identical with that for the steady operation of FIG. 8, and both of those operations can coexist. If the unsteady operation is to be prioritized in the system of the steady operation, or if a quick reply is desirable, a time slot immediately after the command signal transmission from the radio base station can be used for the reply signal transmission. Alternatively, a carrier sense time may be shortened only in the signal transmission requiring the low delay transmission. In this method, the terminal having the carrier sense time shortened can be preferentially transmitted when the time allocation overlaps with each other. Hereinafter, a relationship between the radio base station (110) and the radio terminals (120*d*, 120*e*, 120*f*) is identical with a relationship between the radio relay station (170*b*) and the radio terminals (120*dd*, 120*ee*, 120*ff*).

The sequence time domains 171, 172, and 173 may be reversed in order, or may be conducted plural times.

<Sequence in Unsteady Operation (2)>

FIG. 10 is a diagram illustrating an unsteady operation sequence (corresponding to FIG. 7) of the radio communication network system.

This operating mode is used when the radio terminal measures abnormal data, and transfers the abnormal data to the radio base station at a high speed, and needs to receive the control signal from the radio base station immediately.

Vertical lines extended from the respective radio communication devices (AP, NDA, NDB, NDC) represent the passage of time, and a time of a lower portion is later. Horizontal arrows connecting between the vertical lines indicative of the passage of time indicate radio signals between the respective radio communication devices, and directions thereof.

In the steady operation, a communication is connected between the radio base station (110) and radio relay stations (170*c*, 170*cc*) with a radio communication of the high power. A command signal CMD 145 from the base station (110) is transmitted directly to the radio relay station (170*c*), and a command signal CMD 145*a* is transmitted from the radio relay station (170*c*) to the radio relay station (170*cc*). A reply signal is returned from 170*c* to 110 as 130*g*, and also from 170*cc* to 170*c* as 130*h* (time 174). When all of the routes are sequentially communicated by the radio of the small power, this sequence is not always present.

The base station AP (110) outputs the high power in the downlink, and transfers a command signal 145 to all of the radio terminals NDA (120*g*), NDB (120*h*), and NDC (120*i*)

at the same time at once. The power of the reply signal (or data transmission signal) is regulated so as to reach the radio base station AP directly. A communication of the small power is conducted from the radio terminal NDA, a communication of the medium power is conducted from the radio terminal NDB, and a communication of the large power is conducted from the radio terminal NDC.

A transmission time allocation for the unsteady operation is identical with that for the steady operation of FIG. 8, and both of those operations can coexist. If the unsteady operation is to be prioritized in the system of the steady operation, or if a quick reply is desirable, a time slot immediately after the command signal transmission from the radio base station can be used for the reply signal transmission. Alternatively, a carrier sense time may be shortened only in the signal transmission requiring the low delay transmission. In this method, the terminal having the carrier sense time shortened can be preferentially transmitted when the time allocation overlaps with each other. Hereinafter, a relationship between the radio base station (110) and the radio terminals (120*g*, 120*h*, 120*i*) is identical with a relationship between the radio relay station (170*c*) and the radio terminals (120*gg*, 120*hh*, 120*ii*). The sequence time domains 174, 175, and 176 may be reversed in order, or may be conducted plural times.

(3) Third Embodiment

FIG. 16 is a diagram illustrating a general configuration of a radio communication network system according to a third embodiment of the present invention.

A radio terminal (412) and a radio terminal (413) configure one radio communication network, and a radio terminal (414) and a radio terminal (415) configure another radio communication network. A radio base station (411) conducts a communication with the radio terminal (412) and the radio terminal (414) in the steady situation. This configuration corresponds to the configuration in which the radio terminal (120*a*) and the radio terminal (120*b*) configure a radio communication network, and a plurality of the radio communication networks is present, and communicate with the radio base station 110 in FIG. 1.

When a command signal CMD 421 from the radio base station (411) is output, the command signal CMD is transmitted from the radio terminal (412) to the radio terminal (413) in the radio communication network, and a replay signal REP 423 from the radio terminal (413), and a reply signal REP 424 from the radio terminal (412) are sequentially returned to the radio base station (411). Likewise, at another time, a command signal CMD 425 from the radio base station (411) is transmitted to the radio terminal (414) and the radio terminal (415) configuring another radio communication network, and a replay signal REP 428 is returned to the radio base station (411) through the reply signal REP 427.

Time information is not shared, and not synchronized between the radio communication network configured by the radio terminal (412) and the radio terminal (413), and the radio communication network configured by the radio terminal (414) and the radio terminal (415). Although those radio communication networks are asynchronous with each other, the respective radio terminals (412, 414) are synchronized in time with the radio base station according to the command signal CMD from the radio base station (411), to thereby control the radio wave signals of the respective radio communication networks to be prevented from colliding and interfering with each other.

(4) Fourth Embodiment

FIG. 17 is a diagram illustrating a general configuration of a radio communication network system according to a fourth embodiment of the present invention.

A radio terminal (412) and a radio terminal (413) configure one radio communication network, and a radio terminal (414) and a radio terminal (415) configure another radio communication network. A radio base station (411) conducts a communication with the radio terminal (412) and the radio terminal (414) in the steady situation. This configuration corresponds to the configuration in which the radio terminal (120*a*) and the radio terminal (120*b*) configure a radio communication network, and a plurality of the radio communication networks is present, and communicate with the radio base station 110 in FIG. 1.

A steady or abnormal reply contact 431 is conducted from the radio terminal (413). Also, a steady or abnormal reply contact 432 is conducted from the radio terminal (415). Because the reply contacts 431 and 432 do not receive the respective radio waves in distance, there is no concern about the interference, and synchronization is not required.

When the radio terminal (412) and the radio terminal (414) return the reply signal REP to the base station (411), there is a possibility that the radio waves interfere with each other in the base station (411). Under the circumstances, in order to avoid the interference, the radio terminal (412) holds information on the reply signal REP 431 and the reply signal REP provided in the radio terminals (412), and stands ready. The radio terminal (414) holds information on the reply signal REP 432 and the reply signal REP provided in the radio terminal (414), and stands ready.

The radio base station (411) transmits a command signal CMD 433 to the radio terminal (412) and the radio terminal (414). In the abnormal situation, the power of the radio base station (411) increases, the same command signal 433 can reach even the radio terminal (413) and the radio terminal (415) at the same time. The respective radio terminals (412, 413, 414, 415) share the time information in the command signal CMD 433 of the radio base station (411), and return the reply signals REP 434, 435, 436, and 437 in the required order. This procedure may be determined according to the command signal CMD 433, or may be conducted by another means illustrated in FIG. 20

<Communication Sequence>

FIG. 20 is a diagram illustrating a communication sequence that automatically determines the priority of the radio communication.

Referring to FIG. 20, A, B, and C correspond to the radio terminal, the radio relay station, or the radio base station. Hence, in this example, A, B, and C are called “radio communication device”.

When the radio communication devices B and C transmit data to the radio communication device A at the same timing, the radio waves collide with each other, resulting in a communication failure.

In order to avoid the above interference, a period which is so-called “carrier sense” for investigating whether the radio waves are used, or not, is provide. If the radio wave is not used in the carrier sense 513, the radio communication device B transmits the radio wave to the radio communication device A (514). The radio communication device A receives the data (511), and transmits an acknowledge signal for indicating the reception (512). The radio communication device B receives the acknowledge signal (515), and completes a communication sequence using one time slot time.

When the radio communication devices B and C communicate with each other within the same time slot, an interference is generated. A method for preventing the interference will be described below. That is, lengths of carrier sensor times 513 and 516 of the radio communication devices B and C are set to be different from each other. In the longer carrier sense time 516, because the radio communication device B conducts data transmission 514 during the carrier sense (514), it is determined that the radio waves are used, and the radio communication device C stops the transmission in the same time slot. The radio communication device C again starts from the carrier sense in another time slot, and transmits data if transmittable. The carrier sense time is adjusted according to the priority of the data transmission, thereby being capable of preventing the radio waves from interfering with each other. The carrier sense time is shorter, but the communication is liable to be preferentially conducted.

(5) Fifth Embodiment

FIG. 18 is a diagram illustrating a general configuration of a radio communication network system according to a fifth embodiment of the present invention.

A radio terminal (442) and a radio terminal (443) configure one radio communication network, and a radio terminal (445) and a radio terminal (446) configure another radio communication network. A radio wave of the radio base station (441) reaches the radio relay station (444) with the high power, and a radio wave of the radio relay station (444) reaches the radio relay station (447) with the high power (447).

The radio base station (441) conducts a communication with the radio terminal (442) in the steady situation. Also, the radio base station (441) transfers the signal of the steady situation to the radio relay station (444). The radio relay station (444) communicates with the radio terminal (445) in the steady situation, and also transfers the signal to the radio relay station (447). This corresponds to a configuration in which the radio terminal (120*a*) and the radio terminal (120*b*) configure the radio communication network, and the radio terminal (120*aa*) and the radio terminal (120*bb*) configure the radio communication network for the radio relay station (170*a*) in FIG. 5.

The command signals CMD 451, the CMD 453, the reply signals REP 452, and the REP 454 periodically communicate between the radio base station (441), the radio relay station (444), and the radio relay station (447).

When the command signal CDM 461 is output from the radio base station, the command signal CMD is transferred from the radio terminal (442) to the radio terminal (443) in the radio communication network. Then the reply signal REP from the radio terminal (443), and the reply signal REF from the radio terminals (442) are sequentially returned to the radio base station (441). Likewise, at another time, the command signal CMD 451 from the radio base station (441) is transmitted to the radio relay station (444), and the radio relay station (444) sequentially transfers the command signals CMD 465 and 466 to the radio terminals. The radio relay station (444) returns the reply signal REP 469 to the radio base station (441) through the reply signals REP 467 and 468.

Time information is not shared, and not synchronized between the radio communication network configured by the radio terminal (442) and the radio terminal (443), and the radio communication network configured by the radio terminal (445) and the radio terminal (446). However, the radio relay station (444) and the radio relay station (447) share time information, and are synchronized with each other according to the command signal CMD from the radio base station (441). The replay signals REP 452, REP 464, and REF 469 to the radio base station (441) can be synchronized in time with each other, and the radio wave signals of the respective radio communication networks are prevented from colliding and interfering with each other.

(6) Sixth Embodiment

FIG. 19 is a diagram illustrating a general configuration of a radio communication network system according to a sixth embodiment of the present invention.

Referring to FIG. 19, the radio terminal (442) and the radio terminal (443) configure one radio communication network, and the radio terminal (445) and the radio terminal (446) configure another radio communication network. Also, the radio waves of the radio base station (441) reach the radio relay station (444) with the high power, and the radio waves from the radio relay station (444) reach the radio relay station (447) with the high power.

The radio base station (441) communicates with the radio terminal (442) in the steady situation. Also, the radio base station (441) transfers the signal of the steady situation to the radio relay station (444). The radio relay station (444) communicates with the radio terminal (445) in the steady situation, and further transfers the command signal CMD to the radio relay station (447). This corresponds to a configuration in which the radio terminal (120*a*) and the radio terminal (120*b*) configure the radio communication network, and the radio terminal (120*aa*) and the radio terminal (120*bb*) configure the radio communication network for the radio relay station (170*a*) in FIG. 5.

When the radio terminal (443) and the radio terminal (472) generate the reply signal REP in the unsteady situation, the radio terminal (442) and the radio terminal (445) store reply signal information, and stand ready. Because the communication of the reply signals REP 471 and REP 472 is conducted at a distance where the radio waves interfere with each other, there is no need to conduct the time synchronization. On the other hand, when the radio terminal (442) and the radio terminal (443) return the reply signal REP to the radio base station (441), there is a possibility that the reply signals REP 474 and the REP 475 interfere with the reply signal REP 476 from the radio relay station (444). In that case, the radio terminal (442), the radio terminal (443), and the radio relay station (444) receive the command signal CMD 474 from the radio base station (441), and share the received signal and time information, and return the reply signals REP 474, REP 475, and REP 476 according to a given priority order. The priority order can be determined in the same method as that described in FIG. 17. Also, the reply signals REP 478 and REP 479 are synchronized in time with each other to enable a communication according to a command signal CMD 477 from the radio relay station (444). There is no need to synchronize between the reply signals REP 474 and REP 475, between the reply signals REP 477 and REP 478. Also, the radio relay station (444) stores the reply signal REP from the radio terminal (445) and the radio terminal (446), and stands ready, and returns the reply signal 476 at timing synchronous with the radio base station (441).

CONCLUSION (i) In a radio communication network system according to the present invention, one radio communication network is configured by a plurality of radio terminals, and a plurality of the radio communication networks is present in the radio communication network system. Also, each of the plural radio terminals can operate as a radio relay station that relays received information to another radio terminal or the radio base station. In this system, the radio base station executes the time synchronization on the plural radio terminals included in one radio communication network, and controls the respective radio terminals (the radio terminals included in the network 1, and the radio terminals included in the network 2) included in the different radio communication networks to operate at different times. Also, the radio base station executes the time synchronization among the plural radio terminals within the radio communication network to be communicated when executing a communication in each of the plural radio communication networks. With the above configuration, even in the configuration in which the plural radio communication networks are not synchronized with each other in the steady situation, communications between the radio base station and the respective radio communication networks are prevented from interfering with each other. Therefore, the communication of the steady situation and the communication of the unsteady situation can be realized through the same radio communication network without affecting the respective communication qualities.

(ii) Also, the radio base station switches the transmission radio wave power between the first value and the second value (second value>first value), and executes a communication with the plural radio terminals. With this configuration, the radio base station can execute necessary control without any delay in the unsteady situation, and can acquire the necessary information without any delay. The modes for switching the transmission radio wave power to operate the system include the following four modes. The switching of the power can be conducted according to the content of the data to be communicated, or conducted according to a value of the measurement data from the radio terminals.

Operating mode 1 (corresponding to second embodiment): The radio base station communicates with the radio terminals installed at the first distance (short distance) by the transmission radio wave power (small power) of the first value, and communicates with the relay station installed at the second distance (long distance) by the transmission radio wave power of the second value (medium power or high power). The relay station installed at the second distance communicates with the radio terminals installed at the first distance by the transmission radio wave power (small power) of the first value. With the above configuration, the command can immediately reach the relay station from the base station, and the operation control of the respective radio terminals installed at the distances which cannot be controlled directly from the base station is rapidly conducted. On the other hand, since the data transmission from the respective radio terminals is conducted in the same manner as that in the steady situation, the data transmission can suitably (with power saving) deal with the situation requiring no quickness of the data collection from the radio terminals installed at the long distance.

Operating mode 2 (corresponding to operating mode (a) in FIG. 1): The radio base station executes a communication with the radio terminals installed at the first distance by the transmission radio wave power (small power) of the first value. The radio terminals installed at the first distance and the radio terminals installed at the second distance communicate with each other by the transmission radio wave power (small power) of the first distance. With this configuration, the communication of the steady situation can be subjected to power saving.

Operating mode 3 (corresponding to operating mode (b) in FIG. 1): The radio base station communicates with the radio terminals installed at the first distance (short distance) and the radio terminals installed at the second distance (long distance) by the transmission radio wave power (medium power or high power) of the second value. The radio terminals installed at the first and second distances communicate with each other by the transmission radio wave power of the first value. With this configuration, the respective radio terminals can be rapidly controlled from the base station, and a case in which the data collection from the respective radio terminals is not unhurried can be suitably dealt with.

Operating mode 4 (corresponding to operating mode (c) in FIG. 1): The radio base station communicates with the radio terminals installed at the first distance (short distance) and the radio terminals installed at the second distance (long distance) by the transmission radio wave power (medium power or high power) of the second value. The radio terminals installed at the short distance communicate with the radio base station by the transmission radio wave power of the first value. On the other hand, the radio terminals installed at the long distance communicate with the radio base station by the transmission radio wave power of the second value. With this configuration, the radio base station can rapidly control the respective radio terminals, and can rapidly acquire the necessary information from the respective radio terminals.

(iii) A time during which the radio base station and the plural radio terminals execute communications is determined in advance regardless of a value of the transmission radio wave power used for the communication. That is, the communication is controlled by the TDMA system. With this configuration, the interference in the respective communications can be avoided.

(iv) In the radio communication system (corresponding to the second embodiment) according to the present invention, the radio relay station for relaying the command from the radio base station is provided. The radio relay station is different from the normal radio terminals, does not hold the sensor, does not measure given data, does not transmit the data to the radio base station, and executes the operation for merely relaying the received information. This radio relay station operates as the radio base station for the remote radio terminals which are radio terminals installed at a distance longer than the installation place of the radio relay station from the radio base station. That is, the radio relay station follows the transmission mode of a command between the radio base station and the subject radio relay station (between a previous radio relay station and the subject radio relay station when the plural radio relay stations are installed). The radio relay station executes the communication on the remote radio terminals while switching the transmission radio wave power to another in the same manner as that conducted by the radio base station. Also, the radio relay station transmits the reply signal received from the remote radio terminals to the radio base station by the transmission radio wave power (medium power or high power) of the second value. With the provision of the radio relay station as described above, the radio terminals (radio terminals installed at places that cannot be efficiently communicated even with the high power) installed at the places far from the radio base station can be appropriately controlled, and the data can be surely collected from the terminals.

(v) It should be noted that the present invention can also be realized by a program code of software which realizes the functions of the embodiment. In this case, a system or an apparatus is supplied with a storage medium in which the program code is recorded, and a computer (or a CPU or an MPU) of the system or the apparatus reads the program code stored in the storage medium. In this case, the program code itself read from the storage medium realizes the functions of the above described embodiment, and hence the program code itself and the storage medium in which the program code is stored constitute the present invention. As the storage medium for supplying such a program code, for example, a flexible disk, a CD-ROM, a DVD-ROM, a hard disk, an optical disk, a magnetic-optical disk, a CD-R, a magnetic tape, a nonvolatile memory card, a ROM or the like is used.

Moreover, the functions of the above described embodiment may be realized by causing an OS (operating system) or the like which operates on the computer, to perform a part or all of actual processes based on instructions of the program code. Furthermore, the functions of the above described embodiment may be realized by writing the program code read from the storage medium into a memory on the computer, and then causing a CPU or the like of the computer to perform a part or all of the actual processes based on the instructions of the program code.

Moreover, the program code of the software which realizes the functions of the embodiment may be stored in a storage section such as a hard disk or a memory of the system or the apparatus, or in a storage medium such as a CD-RW or a CD-R, by delivering the program code via a network. When the program code is used, the computer (or the CPU or the MPU) of the system or the apparatus may read and execute the program code stored in the storage section or the storage medium.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. Further, by appropriately combining the components disclosed in the embodiments can form various inventions. For example, it is possible to delete some of the components shown in the embodiments. Further, it may be appropriately combined components in different embodiments. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java (registered trademark), etc.

Furthermore, in the embodiments, control lines and information lines shown are considered to be necessary for description. All control lines and information lines are not necessarily required for products. It may be considered that all constituent elements are interconnected actually.

Moreover, other implementations of the invention will be apparent to those skilled in the art from consideration of the specification and embodiments of the invention disclosed herein. Various aspects and/or components of the described embodiments may be used singly or in any combination in the computerized storage system which has a function of managing data. It is intended that the specification and examples be considered as exemplary only, with a true scope and spirit of the invention being indicated by the following claims.

REFERENCE SIGNS LIST

110, 411, 441 . . . radio base station
120*a* to 120*i*, 120*aa* to 120*ii* . . . radio terminal
170*a* to 170*c*, 170*aa* to 170*cc* . . . radio relay station
311 . . . power circuit
312 . . . timer
313 . . . power switch
314 . . . sensor
315 . . . microcomputer
316 . . . radio circuit
317 . . . amplifier circuit
318 . . . switch
319 . . . filter
321 . . . antenna

The invention claimed is:

1. A radio base station that controls a communication with a plurality of radio terminals in a radio communication network system where one radio communication network includes a plurality of radio terminals, and a plurality of the radio communication networks is present, the radio base station comprising:

radio communication circuitry; and a communication control unit that executes time synchronization on the plurality of radio terminals included in one radio communication network, and controls the respective radio terminals included in the different radio communication networks to operate at different times, wherein the communication control unit executes the time synchronization among the plurality of radio terminals within the radio communication network to be communicated when executing a communication in each of the plurality of radio communication networks, wherein the radio base station switches a transmission radio wave power between at least a first value and a second value which is larger than the first value according at least in part to a content of data to be communicated, and executes a communication with the plurality of radio terminals via the radio communication circuitry, wherein the radio base station communicates with the radio terminals installed at a first distance by the transmission radio wave power of the first value, wherein the radio base station communicates with the radio terminals installed at a second distance longer than the first distance by the transmission radio wave power of the second value, wherein the radio terminals each include a sensor for measuring given data, and wherein the radio base station receives a value of measurement data of the sensor from the radio terminals, and switches the transmission radio wave power to another according to the value of the received measurement data.

2. A radio communication network system including a plurality of radio terminals, and at least one radio base station according to claim 1, and conducting a multihop communication, wherein each of the plurality of radio terminals operates as a radio relay station that relays received information to another radio terminal or the radio base station.

3. The radio communication network system according to claim 1, wherein the radio base station communicates with the radio terminals installed at a first distance by the transmission radio wave power of the first value, and communicates with the radio terminals installed at a second distance longer than the first distance by the transmission radio wave power of the second value, and wherein the radio terminals installed at the second distance communicate with the radio terminals installed at the first distance by the transmission radio wave power of the first value.

4. The radio communication network system according to claim 1, wherein the radio base station communicates with the radio terminals installed at a first distance by the transmission radio wave power of the first value, and wherein the radio terminals installed at the first distance and the radio terminals installed at a second distance longer than the first distance communicate with each other by the transmission radio wave power of the first value.

5. The radio communication network system according to claim 1, wherein the radio terminals installed at the first distance communicate with the radio base station by the transmission radio wave power of the first value, and wherein the radio terminals installed at the second distance communicate with the radio base station by the transmission radio wave power of the second value.

6. The radio communication network system according to claim 1, wherein a time during which the radio base station and the plurality of radio terminals execute a communication is determined in advance regardless of a value of the transmission radio wave power used for the communication.

7. The radio communication network system according to claim 1, wherein at least one of the plurality of radio terminals is a radio relay station that relays a command from the radio base station, wherein the radio relay station operates as the radio base station for remote radio terminals which are the radio terminals installed at a distance more than an installation place of the radio relay station from the radio base station, and executes the communication with the remote radio terminals while switching the transmission radio wave power, and wherein the radio relay station transmits response signals received from the remote radio terminals to the radio base station by the transmission radio wave power of the second value.

8. A communication control method in a radio communication network system that includes a plurality of radio terminals, and at least one radio base station, and conducts a multihop communication, wherein one radio communication network is configured by a plurality of radio terminals, and a plurality of the radio communication networks is present in the radio communication network system, each of the plurality of radio terminals operating as a radio relay station that relays received information to another radio terminal or the radio base station, the radio base station executing time synchronization on the plurality of radio terminals included in one radio communication network, and controlling the respective radio terminals included in the different radio communication networks to operate at different times, the radio base station executing the time synchronization among the plurality of radio terminals within the radio communication network to be communicated when executing a communication in each of the plurality of radio communication networks, the radio base station switching a transmission radio wave power between at least a first value and a second value which is larger than the first value according at least in part to a content of data to be communicated, and executing a communication with the plurality of radio terminals, wherein the radio base station communicates with the radio terminals installed at a first distance by the transmission radio wave power of the first value, wherein the radio base station communicates with the radio terminals installed at a second distance longer than the first distance by the transmission radio wave power of the second value, the radio terminals each include a sensor for measuring given data, and the radio base station receiving a value of measurement data of the sensor from the radio terminals, and switching the transmission radio wave power to another according to the value of the received measurement data.

9. The communication control method according to claim 8, wherein at least one of the plurality of radio terminals is a radio relay station that relays a command from the radio base station, the radio relay station operating as the radio base station for remote radio terminals which are the radio terminals installed at a distance more than an installation place of the radio relay station from the radio base station, and executing the communication with the remote radio terminals while switching the transmission radio wave power, and the radio relay station transmitting response signals received from the remote radio terminals to the radio base station by the transmission radio wave power of the second value.

* * * * *